United States Patent [19]

Takiguchi

[11] Patent Number: 4,620,634

[45] Date of Patent: Nov. 4, 1986

[54] SORTING DEVICE

[75] Inventor: Kiyoaki Takiguchi, Yokohama, Japan

[73] Assignee: Computer Services Corporation, Tokyo, Japan

[21] Appl. No.: 491,580

[22] Filed: May 4, 1983

[30] Foreign Application Priority Data

| May 25, 1982 | [JP] | Japan | 57-88639 |
| May 29, 1982 | [JP] | Japan | 57-91565 |
| Jun. 4, 1982 | [JP] | Japan | 57-95968 |
| Aug. 20, 1982 | [JP] | Japan | 57-144072 |
| Aug. 24, 1982 | [JP] | Japan | 57-146427 |
| Oct. 30, 1982 | [JP] | Japan | 57-191228 |
| Dec. 3, 1982 | [JP] | Japan | 57-212478 |
| Dec. 20, 1982 | [JP] | Japan | 57-223596 |

[51] Int. Cl.$^4$ .......................... B07C 3/04; B07C 5/00
[52] U.S. Cl. .................... 209/44.3; 209/557; 209/569; 209/583; 209/634; 209/683
[58] Field of Search ............ 209/44.1–44.3, 209/555, 557, 569, 583, 584, 629, 634, 664, 680, 683, 684, 687, 900, 255, 259, 288, 370, 534, 257; 271/270

[56] References Cited

U.S. PATENT DOCUMENTS

| 453,185 | 6/1891 | Gschwender | 209/683 X |
| 2,052,310 | 8/1936 | Lifsitz | 271/270 |
| 3,022,891 | 2/1962 | Efram et al. | 209/583 X |
| 3,252,570 | 5/1966 | Smith | 209/569 X |
| 3,710,936 | 1/1973 | Mizunuma | 209/583 X |
| 3,889,811 | 6/1975 | Yoshimura | 209/584 X |
| 3,930,581 | 1/1976 | Gray | 209/534 |

FOREIGN PATENT DOCUMENTS 0949670 2/1964 United Kingdom ................ 209/683

Primary Examiner—Robert B. Reeves
Assistant Examiner—Edward M. Wacyra
Attorney, Agent, or Firm—Koda and Androlia

[57] ABSTRACT

A sorting device for sorting out a multiplicity of pieces such as tickets, for example, according to their size includes a frame, a drum rotatably mounted in the frame for storing therein pieces such as tickets having different sizes to be sorted out, a sorter on the drum including openings of different dimensions for passing therethrough pieces of different sizes, respectively, and a collector disposed peripherally around the drum in radial alignment with those openings of one dimension for collecting pieces of a particular size passing through the last-mentioned openings. The drum is rotated by a motor about its own axis to cause the pieces of the particular size to be discharged through the openings of the one dimension out of the drum. The sorting device also has a separator for separating superimposed sorted-out pieces from each other. Magnetic or optical information recorded on sorted-out pieces is read by a magnetic or optical reader. Those pieces with defective recorded information is rejected by a rejector coacting with the magnetic or optical reader. The sorting device has collector boxes for receiving differently sized pieces, respectively, that have been sorted out. The pieces while being sorted out of the drum are prevented by a seal from slipping away out of the collector.

4 Claims, 43 Drawing Figures

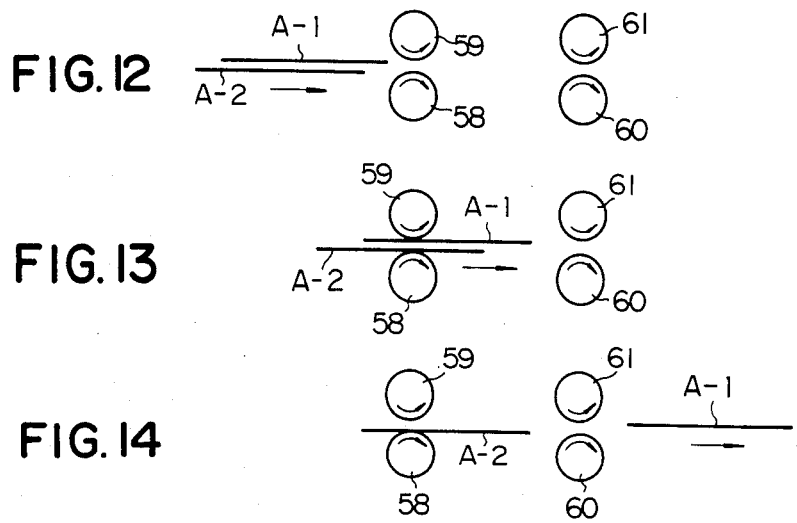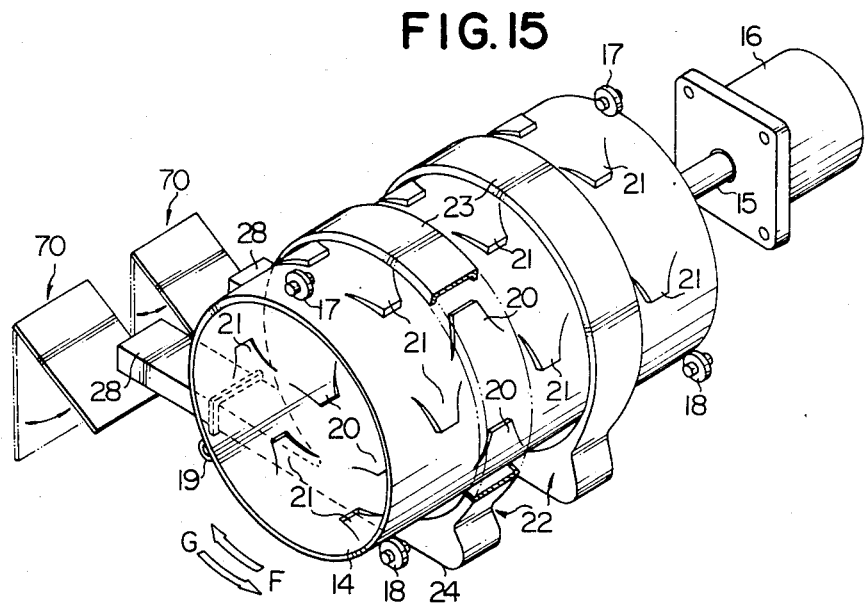

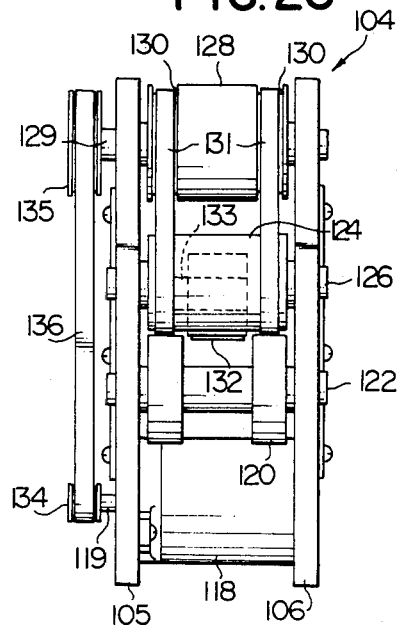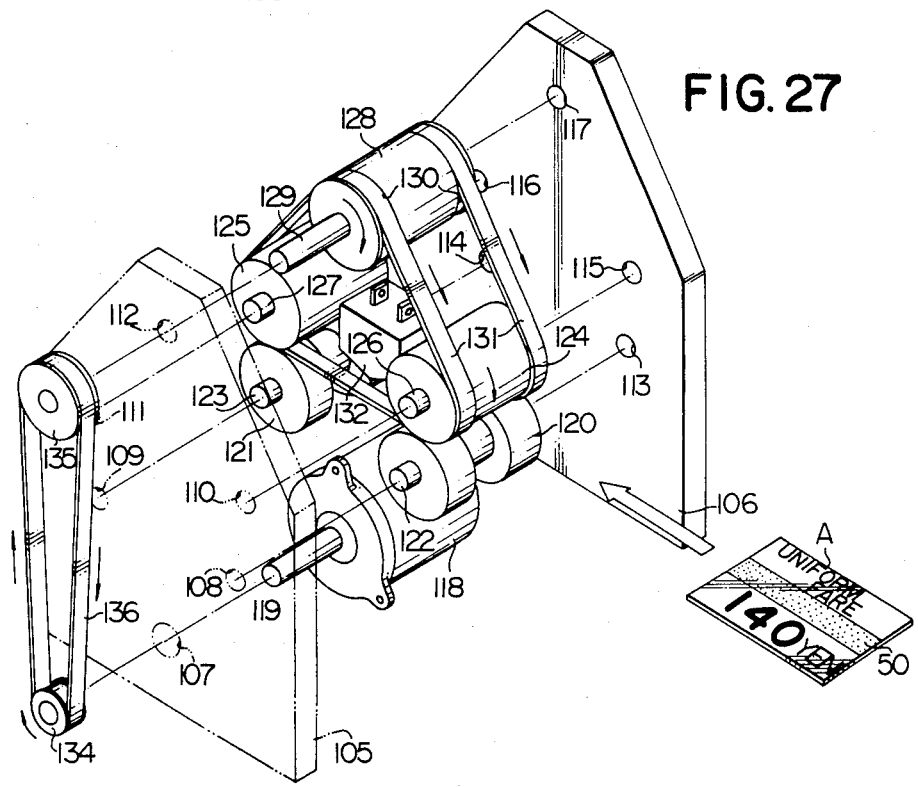

SORTING DEVICE

BACKGROUND OF THE INVENTION

The present invention relates to a sorting device for sorting out differently sized thin pieces such as tickets, metal pieces, coins, or other tokens according to their size, and more particularly to a mechanism in such a sorting device for collecting sorted-out pieces in a manner to facilitate later processing.

Small articles of different sizes can manually be sorted out according to their size, but the manual sorting operation has been time-consuming and subjected to errors. Various automatic sorting mechanisms have heretofore been used for mechanically or electrically classifying and sorting out different kinds of pieces according to their size. Though the known automatic sorters are highly effective to sort out relatively heavy and thick objects such as coins or nuts, the mechanisms fail to divide relatively light and thin pieces into groups according to their size. No sorting device has been developed which is capable of sorting out light and thin articles without suffering from errors. It has therefore been customary practice to resort to manual procedures for sorting out pieces of paper such as tickets, pieces of cloth, or thin pieces of metal.

SUMMARY OF THE INVENTION

It is an object of the present invention to provide a sorting device having means for collecting sorted-out pieces for later processing.

Another object of the present invention is to provide a sorting device including a separator for separating sorted-out pieces from each other to facilitate later processing.

Still another object of the present invention is to provide a sorting device having a reader capable of magnetically or optically reading information recorded on sorted-out pieces.

Still another object of the present invention is to provide a sorting device having a rejector for rejecting any defective pieces sorted out in response to a signal from a reader which reads recorded information on the tickets.

Still another object of the present invention is to provide a sorting device which includes storage containers for receiving differently sized pieces, respectively, that have been sorted out.

A still further object of the present invention is to provide a sorting device capable of automatically sorting out, collecting, and reading information from pieces of different sizes.

A yet still further object of the present invention is to provide a sorting device including a rotatable sorter drum and a plurality of collector guide channels disposed therearound with seal means interposed therebetween for preventing collected pieces from passing out of the collector channels between the sorter drum and the collector channels.

According to the present invention, a device for sorting out a multiplicity of pieces according to their size includes a frame, a drum rotatably mounted in the frame for storing therein pieces such as tickets having different sizes to be sorted out, sorter means on the drum including openings of different dimensions for passing therethrough pieces of different sizes, respectively, and collector means disposed peripherally around the drum in radial alignment with those openings of one dimension for collecting pieces of a particular size passing through the last-mentioned openings. The drum is rotated by a motor about its own axis to cause the pieces of the particular size to be discharged through the openings of the one dimension out of the drum. The sorting device also has a separator for separting superimposed sorted-out pieces from each other. Magnetic or optical information recorded on sorted-out pieces is read by a magnetic or optical reader. Those pieces with defective recorded information is rejected by a rejector coacting with the magnetic or optical reader. The sorting device has collector boxes for receiving differently sized pieces, respectively, that have been sorted out. The pieces while being sorted out of the drum are prevented by seal means from slipping away out of the collector means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 12 through 14 are schematic side elevational views of the separator, showing operation thereof for separating superimposed tickets;

FIG. 15 is a perspective view of a sorter drum with rejector means according to still another embodiment of the invention;

FIG. 26 is a front elevational view of the magnetic reader assembly of FIG. 24;

FIG. 27 is an exploded perspective view of the magnetic reader assembly shown in FIG. 24;

DETAILED DESCRIPTION

Figure 1:
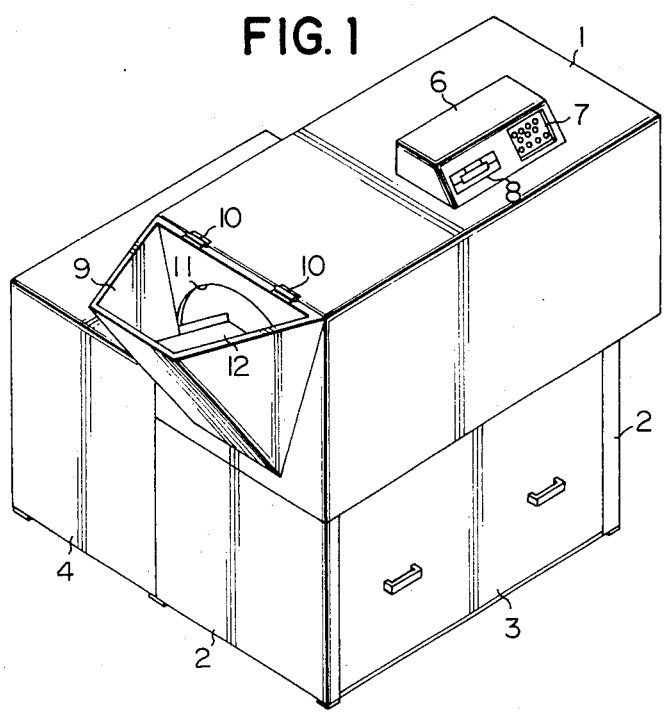
FIG. 1 is a perspective view of a sorting device according to the present invention.

The present invention is particularly useful when embodied in a device for sorting out rectangular pieces of paper such as tickets or price tags according to their size. However, the sorting device can also be used to sort out other thin, lightweight pieces or articles such as coins, pieces of cloth, or the like according to their size. Like or corresponding parts are denoted by like or corresponding reference numerals throughout several views.

Figure 2:
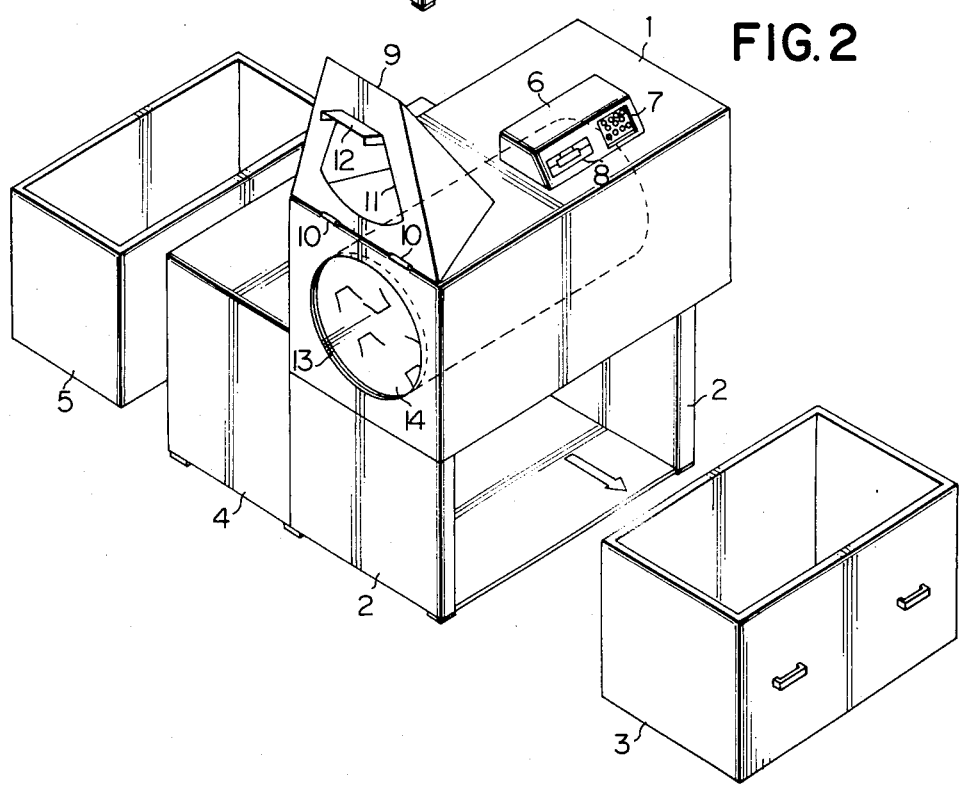
FIG. 2 is an exploded perspective view of the sorting device shown in FIG. 1.

As illustrated in FIGS. 1 and 2, a sorting device comprises a body or frame 1 from which depend a pair of legs 2 spaced laterally from each other, and a collector box 3 opening upwardly and removably interposed between the legs 2. A rectangular box 4 is fixed to the legs 2 behind the collector box 3. Another collector box 5 opening upwardly is removably disposed in the box 4. The frame 1 has thereon a control box 6 including a slanted control panel 7 with switches and lamps. A floppy disk drive 8 is mounted in the control box 6 for storing read information in a floppy disk (not shown) inserted in the drive 8. A ticket charger 9 is pivotably connected by hinges 10 to an upper edge of the frame 1, and is of a triangle cross section. The ticket charger 9 has an upper trapezoidal opening and a charging hole 11 in its side which normally faces the frame 1. The ticket charger 9 also includes a slanted chute 12 extending through the charging hole 11 into the frame 1 when the ticket charger 9 is in the ticket charging position as shown in FIG. 1. As shown in FIG. 2, the collector box 3 can laterally be slid out, and the ticket charger 9 can be angularly moved to an upper position in which the ticket charger 9 is placed on an upper surface of the frame 1. The frame 1 has a circular opening 13 in the side thereof on which the ticket charger 9 is mounted. A sorter drum 14 is housed in the frame 1 and has an open end substantially in registry with the circular opening 13. When the ticket charger 9 is in the ticket charging position, the circular opening 13 is covered with the ticket charger 9 with the chute 12 of the ticket charger 9 extending through the circular opening 13 into the sorter drum 14. When the ticket charger 9 is lifted as shown in FIG. 2, the circular opening 13 is exposed to provide access into the sorter drum 14 therethrough.

Figure 3:
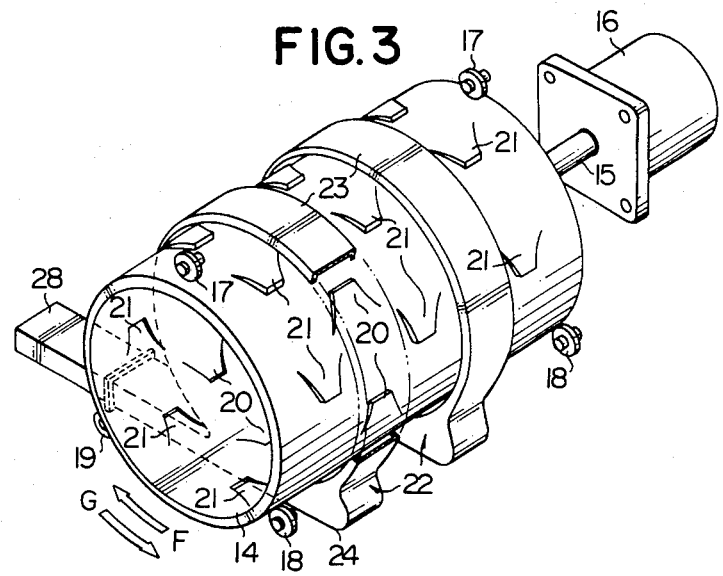
FIG. 3 is a perspective view of a sorter drum with collector guide channels and readers in the sorting device of FIG. 1.

As illustrated in FIG. 3, the sorter drum 14 has a hollow cylindrical wall of thin metal sheet having one end open (lefthand as shown) and the other end closed off to which is concentrically connected a drive shaft 15 coupled to a motor 16. The sorter drum 14 has a central axis extending horizontally, and is rotatably supported by a plurality of rollers 17, 18, 19 held in rolling engagement with the cylindrical wall of the sorter drum 14.

Figure 5:
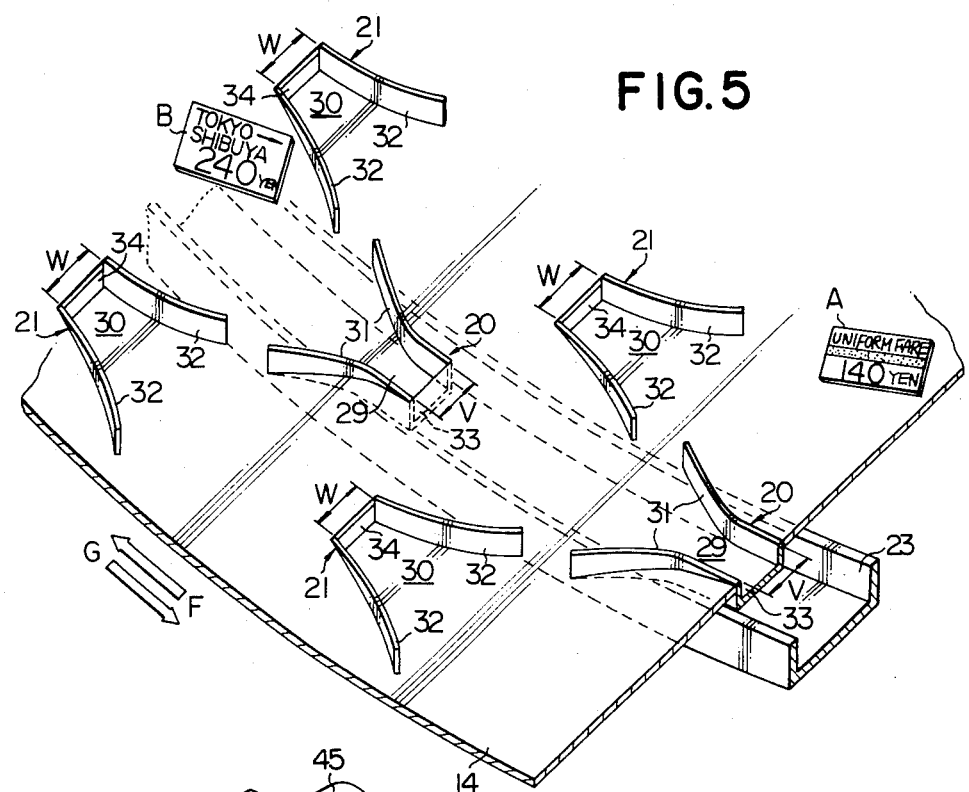
FIG. 5 is an enlarged fragmentary perspective view of the sorter drum shown in FIG. 3.

The sorter drum 14 has a plurality of parallel rows of sorters 20, 21 extending circumferentially of the cylindrical wall. In the illustrated embodiment, the sorters 20 are provided in two rows, and the sorters 21 are provided in three rows. The rows of the sorters 20, 21 are arranged axially of the sorter drum 14 and circumferentially spaced from adjacent ones. As shown in FIG. 5, each of the sorters 20 includes a tapered tongue 29 sheared radially outwardly off the cylindrical wall. The tapered tongue 29 has an end edge displaced radially outwardly from the cylindrical wall to define therewith an opening 33 extending radially outwardly and having a length V that is selected to allow passage of tickets of a particular size through the opening 33. Accordingly, the tapered tongues 20 terminate respectively in the openings 33 and are progressively narrower toward the openings 33 to provide tapered slide surfaces. A pair of guide strips 31, 31 extends along the opposite side edges of each tapered tongue 29 and is secured to both the side edge and the cylindrical wall. The guide strips 31 paired on both sides of each slide surface thus provide a chute for guiding tickets to be sorted out toward the opening 33. More specifically, one end of each guide strip 31 is located at the distal end of the slide surface and serves to define the opening 33, while the other end is positioned at the opposite end of the slide surface which blends into the cylindrical wall of the sorter drum 14, and protrudes radially inwardly of the sorter drum 14. Likewise, each of the sorters 21 includes a tapered tongue 30 sheared radially outwardly off the cylindrical wall and circumferentially in a direction opposite to that in which the tapered tongues 29 are oriented. The tapered tongue 30 has an end edge displaced radially outwardly from the cylindrical wall to define therewith an opening 34 extending radially outwardly and having a length W that is selected to allow passage of tickets of another particular size through the opening 34. Accordingly, the tapered tongues 21 terminate respectively in the openings 34 and are progressively narrower toward the openings 34 to provide tapered slide surfaces. A pair of guide strips 32, 32 extends along the opposite side edges of each tapered tongue 30 and is secured to both the side edge and the cylindrical wall. The guide strips 32 paired to both sides of each slide surface thus provide a chute for guiding tickets to be sorted out toward the opening 34. More specifically, one end of each guide strip 32 is located at the distal end of the slide surface and serves to define the opening 34, while the other end is positioned at the opposite end of the slide surface which blends into the cylindrical wall of the sorter drum 14, and protrudes radially inwardly of the sorter drum 14.

Figure 4:
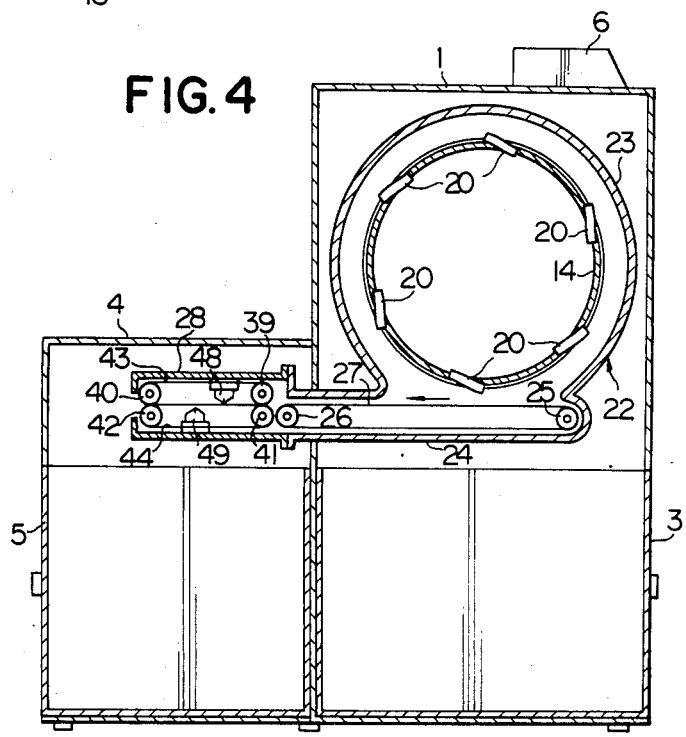
FIG. 4 is a vertical cross-sectional view of the sorting device illustrated in FIG. 1.

As illustrated in FIGS. 3 and 4, a pair of annular collectors 23, 23 is disposed around the sorter drum 14 in axially spaced relation to each other. Each of the annular collector 23, 23 is composed of an annular guide channel 23 disposed in radial alignment with and surrounding relation to one of the rows of the tapered tongues 20, and a horizontal discharge chute 24 positioned below and connected to the annular guide channel 23. The radially inward edges of the annular guide channels 23 are slightly spaced from the outer circumferential surface of the sorter drum 14. Each of the horizontal discharge chute 24 has a hollow rectangular casing having therein a pair of spaced rollers 25, 26 and an endless conveyor belt 27 trained around the rollers 25, 26 and positioned below the row of sorters 20. A magnetic reader assembly 28 is composed of a hollow rectangular casing coupled to an open end of the casing of the discharge chute 24.

Figure 7:
FIGS. 7 and 8 are enlarged plan views of tickets of different sizes to be sorted out.
Figure 8:

FIGS. 7 and 8 illustrate a ticket A having a width X and a ticket B having a width Y, respectively, the width Y being greater than the width X. The ticket A has a longitudinal magnetized strip 50 containing various items of magnetically recorded information such as a company name, fare, issue date and other data. The width V of each opening 33 in the sorter drum 14 is selected to be greater than the width X of the ticket A, but smaller than the width Y of the ticket B. The width W of each opening 34 is larger than the width Y of the ticket B.

Figure 6:
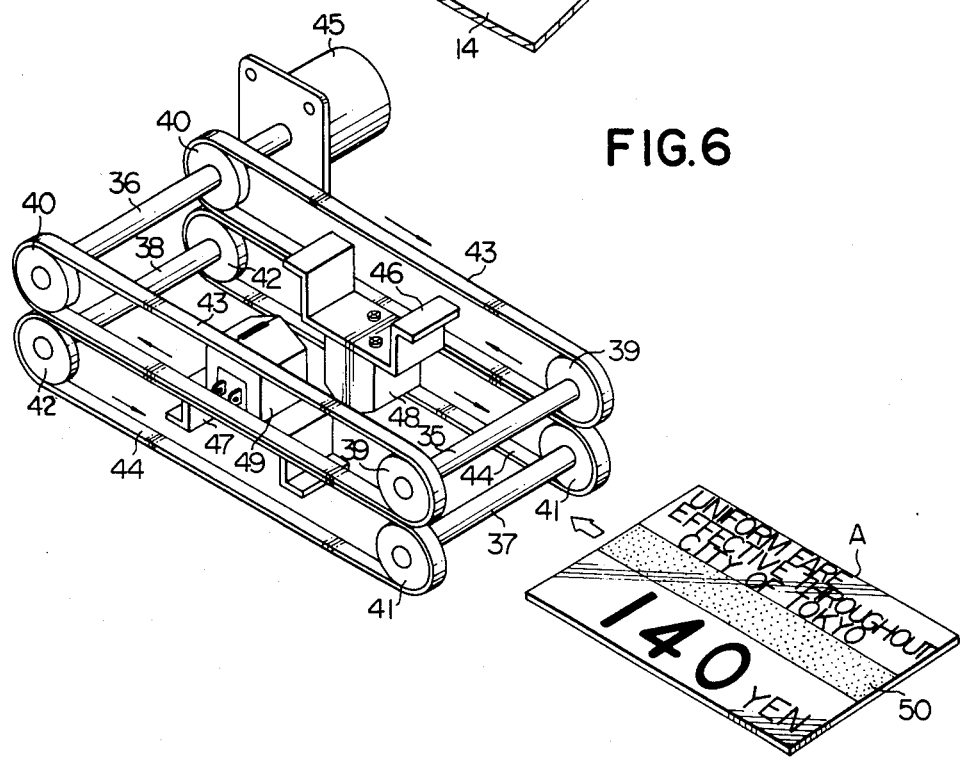
FIG. 6 is an enlarged perspective view of a magnetic reader assembly in the sorting device of FIG. 4.

As shown in FIG. 6, the magnetic reader assembly 28 comprises a pair of upper and lower magnetic reading heads 48, 49 for reading magnetically recorded information on the tickets A. The magnetic reader assembly 28 also includes a feeder comprising a pair of parallel spaced shafts 35, 36 supporting two pairs of spaced rollers 39, 40, a pair of endless belts 43, 43 trained around the pairs of spaced rollers 39, 40, a pair of parallel spaced shafts 37, 38 supporting two pairs of spaced rollers 41, 42, a pair of endless belts 44, 44 trained around the pairs of spaced rollers 41, 42 and held against the pairs of endless belts 43, 43, and a motor 45 coupled with the shaft 36 for driving the endless belts 43, 44 to feed the tickets A along a horizontal path defined between the endless belts 43, 44. The magnetic pickup heads 48, 49 are supported respectively mounted on a pair of head mounts 46, 47 spaced horizontally from each other and positioned upwardly and downwardly of the horizontal path. The magnetic pickup heads 48, 49 have information pickup surfaces located at the horizontal path between the endless belts 43, 44. With the magnetic pickup heads 48, 49 installed upwardly and downwardly of the horizontal path, the information recorded on the ticket A can be read irrespectively of whether the magnetic strip 50 faces upwardly or downwardly.

Operation of the sorting device of the foregoing construction will be described. The sorting device 1 is set as shown in FIG. 1, and a mixture of tickets A, B is thrown through the ticket charger 9 into the sorter drum 14. To sort out smaller tickets A, a start switch on the control panel 7 is pushed to energize the motor 16 to rotate the sorter drum 14 in the direction of the arrow F (FIGS. 3 and 5). Thus, the sorter drum 14 rotates about its own axis with the wider ends of the tapered tongues 29 as leading ends and the openings 33 as trailing ends, causing the tickets A, B to slide on the inner peripheral surface of the sorter drum 14 and be mixed with each other. The tickets A, B tend to be collected in a lower position in the rotating sorter drum 14, wherein the tickets A, B are guided by the guide strips 31 toward the openings 33 of the sorters 20 over the tapered tongues 29. Since the length V of the openings 33 is larger than only the width X of the tickets A, only the tickets A are allowed to pass through the openings 33 out of the sorter drum 14. The larger tickets B however remain trapped inside the sorter drum 14 as they cannot go through the openings 33 and may get caught by the guide strips 31 or slide over the openings 33. The tickets A as they are discharged out of the sorter drum 14 are then received by the guide channels 23, from which the tickets A slide down onto the endless belt 27. The belt 27 is driven in the direction of the arrow to deliver the tickets A toward the reader assembly 28. The tickets A enter the reader assembly 28 one by one and are sandwiched at edges thereof by the endless belts 43, 44 while being driven at a constant speed by the motor 45. The magnetic strip 50 coated on the ticket A is brought into contact with one of the magnetic pickup heads 48, 49 which reads the magnetically recorded information. When the ticket A reaches the terminal ends of the path between the endless belts 43, 44, the ticket A is discharged out of the reader assembly 28 into the collection box 5 (FIG. 4).

After all of the tickets A have been discharged, the motor 16 is de-energized by a timer (not shown), and the control panel 7 is manipulated to reverse the motor 16 to rotate the sorter drum 14 in the direction of the arrow G. The tickets B are then guided by the guide strips 32 of the sorter 21 to go through the openings 34, from which the tickets B are discharged out of the sorter drum 14 into the collection box 3. The motor 16 continuously rotates the sorter drum 14 in the direction of the arrow G until the motor 16 is de-energized by a timer (not shown). When the motor 16 is de-energized, paper pieces, defective tickets, bank notes and other debris, if any, that fail to pass through the sorters 20, 21 remain trapped in the sorter drum 14. Therefore, the tickets A are stored in the collection box 5, the tickets B in the collection box 3, and the information as read by the magnetic heads 48, 49 is stored in a floppy disk inserted in the floppy disk drive 8.

Thereafter, the sorting device is cleaned in preparation for a next sorting operation. The collection boxes 3, 5 are drawn out in forward and rearward directions, respectively, and the stored tickets A, B are put into storage cans or boxes, respectively. The tickets A, B will be burned or shredded at a later time. The ticket charger 9 is turned up about the hinge 10 to expose the opening 13 as shown in FIG. 2. Any defective tickets and other debris are manually taken out or removed by a suction cleaner for storage separately from the tickets A, B. The empty collection boxes 3, 5 are inserted back into the sorting device, and the ticket charger 9 is turned down about the hinge 10 to the position of FIG. 1. The sorting device is now readied for another cycle of sorting operation.

Figure 9:
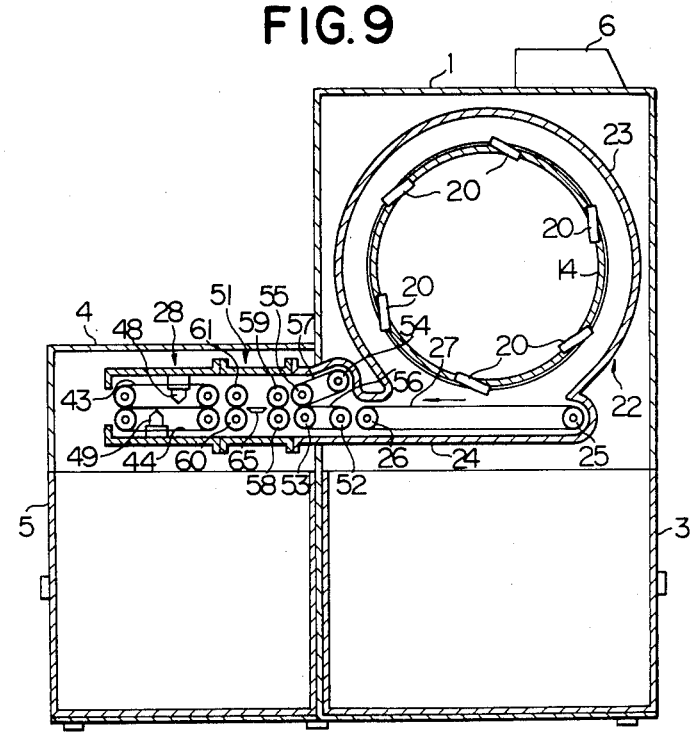
FIG. 9 is a vertical cross-sectional view of a sorting device according to another embodiment of the present invention.
Figure 10:
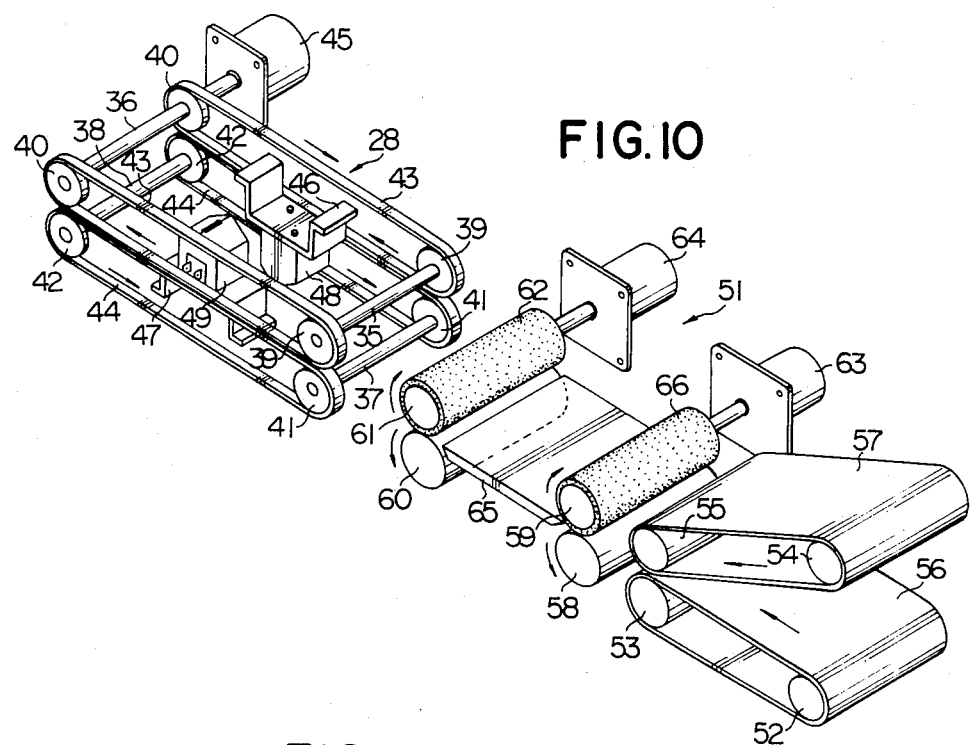
FIG. 10 is an enlarged perspective view of a magnetic reader assembly and a separator in the sorting device shown in FIG. 9.
Figure 11:
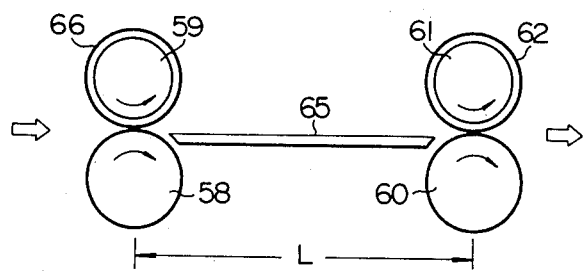
FIG. 11 is a side elevational view of the separator of FIG. 10.

FIGS. 9 and 10 illustrate a ticket separator 51 interposed between the discharge chute 24 and the reader assembly 28 for separating any superimposed tickets from each other so that the tickets can be fed one by one into the reader assembly 28. The ticket separator 51 comprises a first pair of rollers 58, 59, a second pair of rollers 60, 61 spaced horizontally from the first pair of rollers 58, 59, a first rubber tube 66 fitted over the roller 59 and held rollingly against the other roller 58, a second rubber tube 62 fitted over the roller 61 and held against the other roller 60, a slide plate 65 positioned between the first and second pairs of rollers 58, 59, 60, 61, a first motor 63 for rotating the roller 59 about its own axis, and a second motor 64 for rotating the roller 61 about its own axis. The slide plate 65 has an upper surface lying substantially flush with the planes in which the rubber tubes 66, 62 contact the rollers 58, 60, respectively. A lower endless belt 56 is trained around a pair of horizontally spaced rollers 52, 53 placed in front of the roller 58 to provide a horizontal feed surface. An upper endless belt 57 is trained around a pair of rollers 54, 55 positioned upwardly of the rollers 52, 53, the roller 54 being higher than the roller 55. The upper endless belt 57 is thus inclined with respect to the lower endless belt 56 so that the upper endless belt 57 provides a slanted guide surface which converges toward the lower endless belt 56. A shown in FIG. 11, the axes of the rollers 58, 60 are spaced from each other by a distance L slightly larger than the length of a ticket A to be delivered to the reader assembly 28. The roller 61 is rotated by the motor 64 over 100 times faster than the roller 59 is rotated by the motor 63.

The separator 51 will operate as follows: Any superimposed tickets A-1, A-2 as discharged out of the sorter drum 14 are guided between the upper and lower endless belts 57, 56 and by the rollers 53, 55 into the separator 51, as shown in FIG. 12. The tickets A-1, A-2 are fed by the rollers 58, 59 slidably over the slide plate 65, as illustrated in FIG. 13. When one of the superimposed tickets A-1 which is slightly ahead of the other is brought into contact with one of the rollers 61, the ticket A-1 is pulled by the roller 61 at a much higher speed than the speed of travel of the other ticket A-2. At this time, the trailing edge of the ticket A-1 has already been disengaged from the roller 59 because the interaxial distance between the rollers 58, 60 is shorter than the tickets A. The other ticket A-2 still remains gripped between the rollers 58, 59. Therefore, the ticket A-2 is delayed and only the ticket A-1 is delivered to the reader assembly 28.

Figure 16:
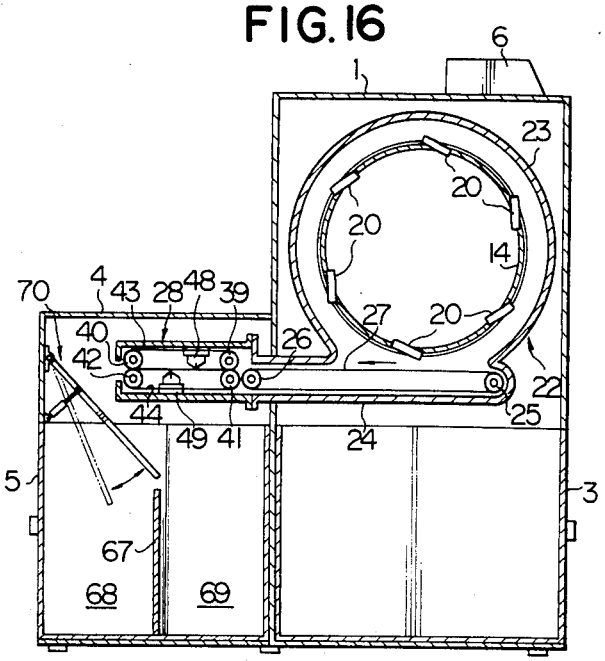
FIG. 16 is a vertical cross-sectional view of a sorting device having the sorter drum and the rejector means illustrated in FIG. 15.
Figure 17:
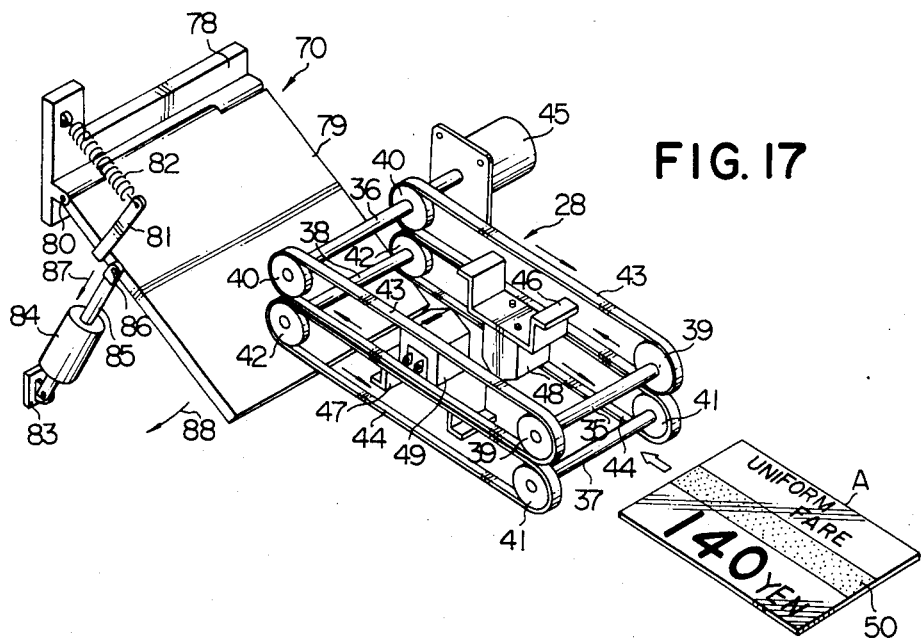
FIG. 17 is an enlarged perspective view of a magnetic reader assembly and the rejector means associated therewith in the sorting device of FIG. 16.

According to another embodiment shown in FIGS. 15, 16 and 17, each reader assembly 18 is associated with a ticket rejector 70 for rejecting any ticket which has wrong recorded information or has not been read correctly by the reader assembly 28. The ticket rejector 70 comprises a rejector plate 79 pivotably mounted by a pivot pin 80 on a support 78 at a discharge end of the reader assembly 28, and a solenoid 84 pivotably connected to a joint 83 and having a solenoid-actuated rod 85 pivotably connected by a pivot pin 86 to the rejector plate 79. A bar 81 is fixed at one end to the rejector plate 79. A coil spring 82 is connected between the support 78 and the other end of the solenoid-actuated rod 85. When the solenoid 84 is energized, the rod 85 is pulled thereby in the direction of the arrow 87 to turn the rejector plate 79 clockwise (FIG. 17) in the direction of the arrow 88. The solenoid 84 is energizable in response to a signal from the magnetic pickup head 48 or 49. The rejector plate 79 is normally urged by the spring 82 into a nonactuated position as shown by the solid line in FIG. 16. The collector box 5 has two front and rear box sections 68, 69 divided by a vertical partition 67.

In operation, the rejector plate 79 remains inactivated in the solid-line position of FIG. 16 as long as tickets A as sensed by the magnetic pickup heads 48, 49 are normal. Therefore, such normal tickets A as fed from the reader assembly 28 are guided by the rejector plate 79 to drop into the rear box section 69. When the magnetic pickup head 48 or 49 detects any wrong magnetically recorded information on a ticket A or fails to detect magnetically recorded information on a ticket A, the solenoid 84 is energized in response to a signal issued by the magnetic pickup head 48 or 49 to pull the rod 85, whereupon the rejector plate 79 is deflected toward the imaginary-line position shown in FIG. 16. The defective ticket A is then guided by the rejector plate 79 to fall into the box section 68. Accordingly, defective tickets A can be stored in the front box section 68. The collected defective tickets A will later be checked manually to provide accurate statistical data.

A sorting device according to a still other embodiment of the present invention is illustrated in FIGS. 18 through 22.

Figure 18:
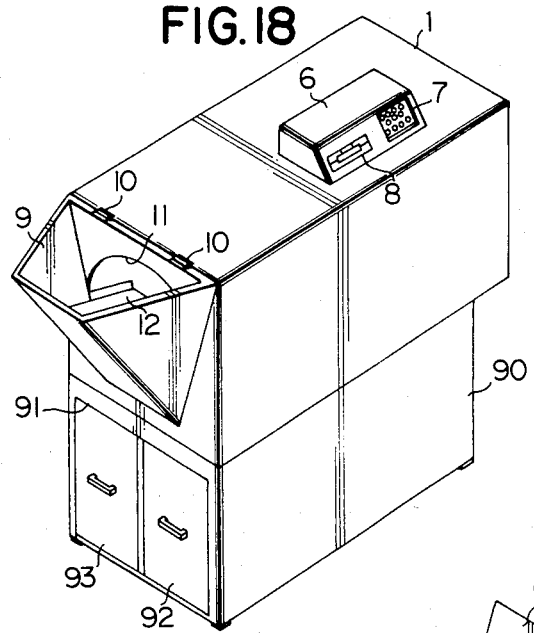
FIG. 18 is a perspective view of a sorting device according to a still further embodiment of the present invention.
Figure 19:
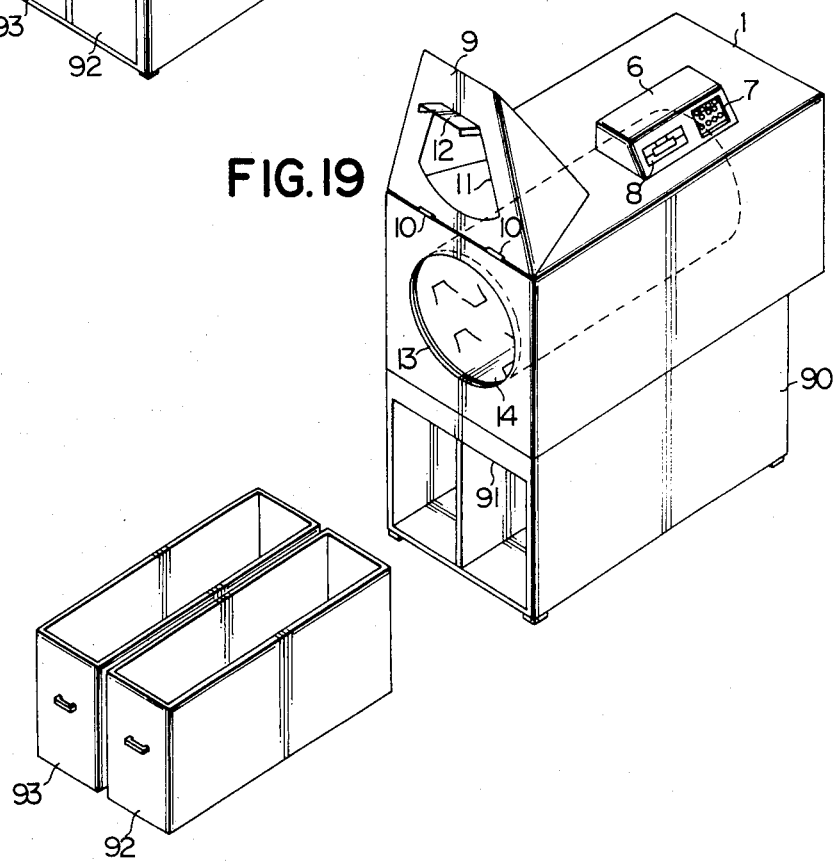
FIG. 19 is an exploded perspective view of the sorting device illustrated in FIG. 18.
Figure 20:
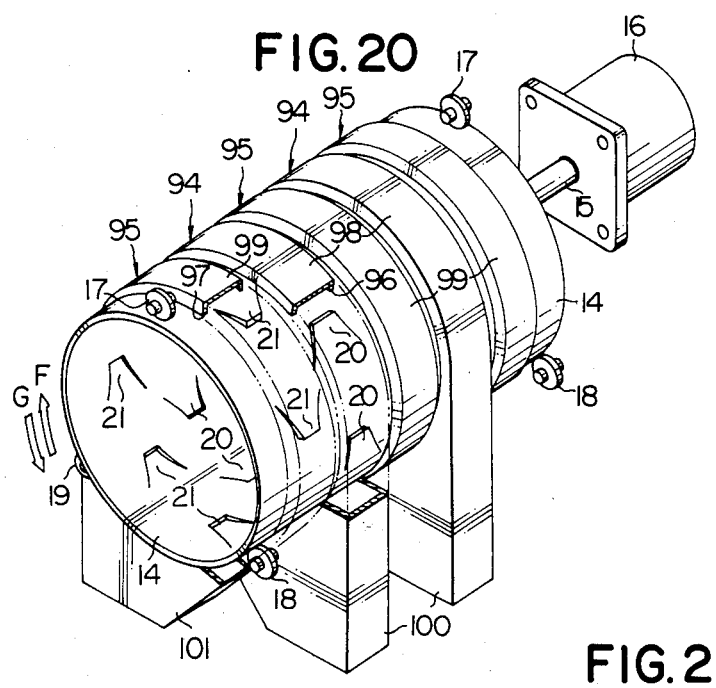
FIG. 20 is a perspective view of a sorter drum with collector guide channels and discharge chutes in the sorting device of FIG. 18.
Figure 21:
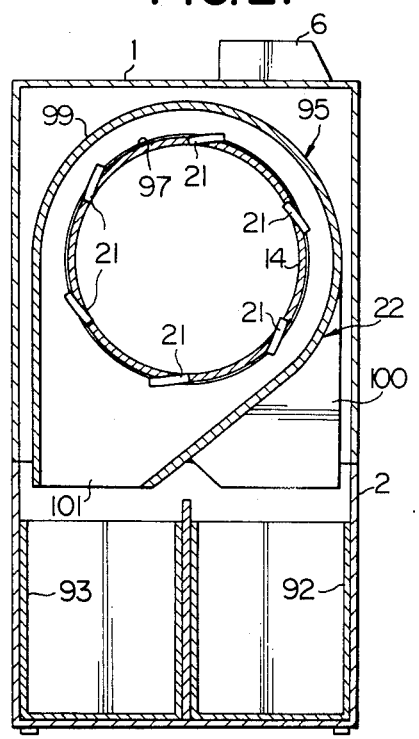
FIG. 21 is a vertical cross-sectional view of the sorting device of FIG. 18.
Figure 22:
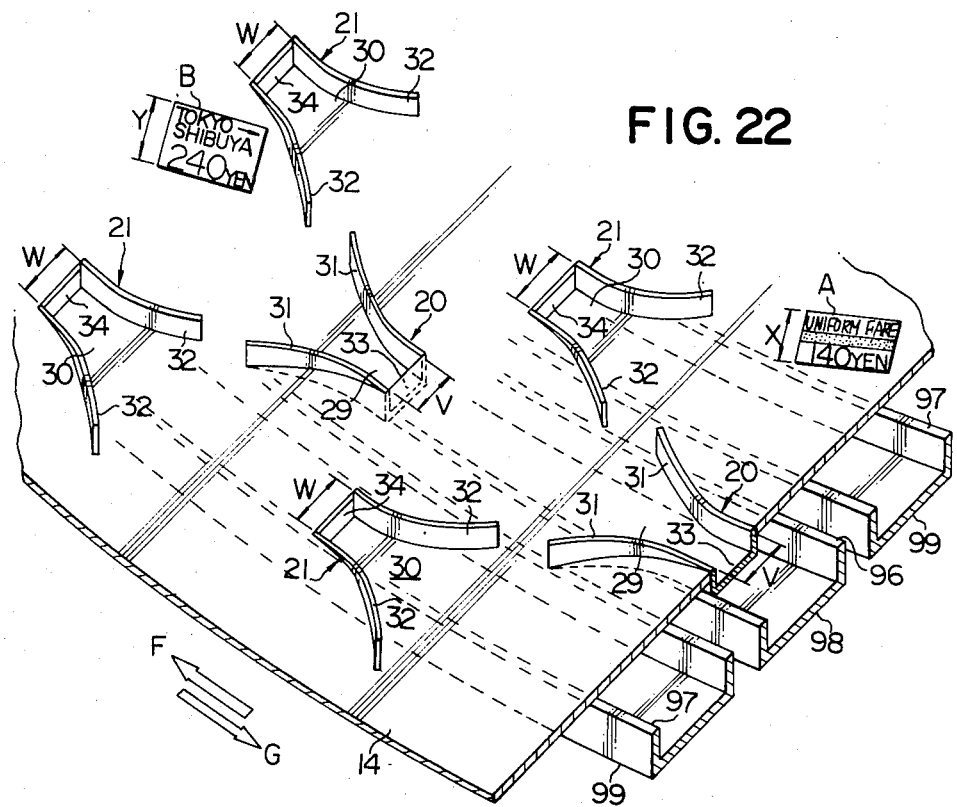
FIG. 22 is an enlarged fragmentary perspective view of the sorter drum shown in FIG. 20.
Figure 23:
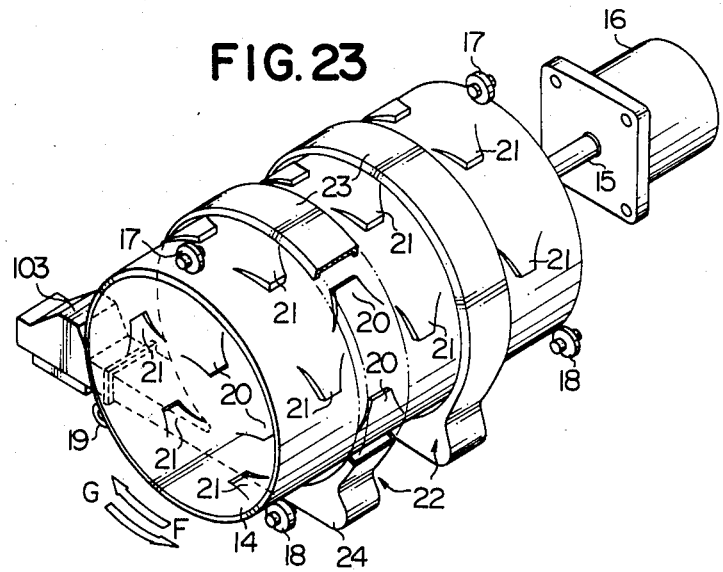
FIG. 23 is a perspective view of a sorter drum coupled with a magnetic reader assembly according to another embodiment.
Figure 24:
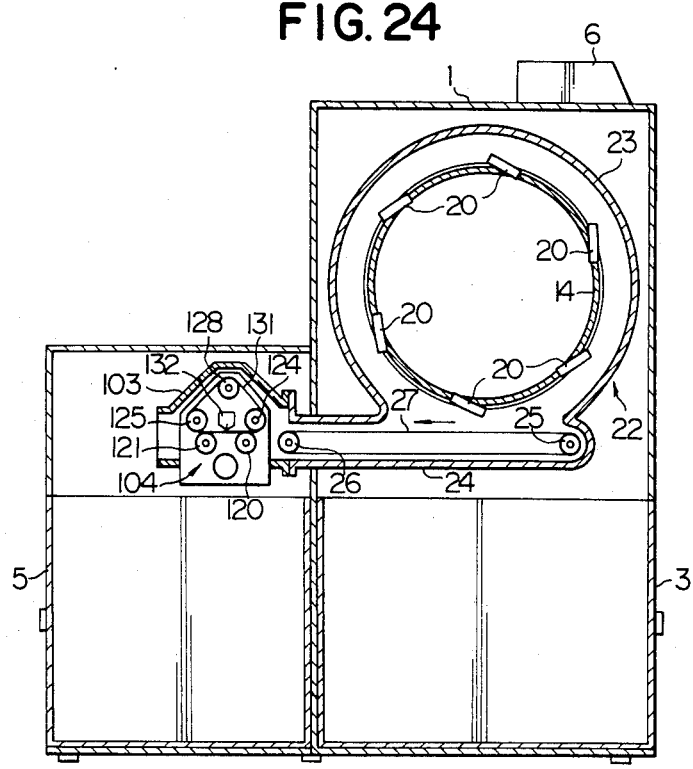
FIG. 24 is a vertical cross-sectional view of a sorting device having the sorter drum and the magnetic reader assembly of FIG. 23.

The sorting device as shown in FIGS. 18 and 19 is different from the sorting device in that the frame 1 includes a hollow rectangular leg 90 having a partitioned opening 91 in which two elongate collector boxes 92, 93 having upper open ends are removably disposed. As illustrated in FIG. 20, annular collectors 94, 95 are axially alternately disposed around the sorter drum 14. The annular collectors 94 are composed of guide channels 98 held in radial alignment with and in surrounding relation to the rows of sorters 20 and discharge chutes 100 having constricted lower ends opening above the collector box 92, as illustrated in FIG. 21. Likewise, the annular collectors 95 are composed of guide channels 99 held in radial alignment with and in surrounding relation to the rows of sorters 21 and discharge chutes 101 having constricted lower ends opening above the collector box 93. The guide channels 98, 99 include flanges having inner peripheral edges 96, 97, respectively, extending around the outer circumferential surface of the sorter drum 14 with small clearances therebetween. The constricted lower ends of the discharge chutes 100, 101 are defined by vertical and slanted sidewalls. When the sorter drum 14 is rotated about its own axis in the direction of the arrow F with tickets A, B stored therein, the narrower tickets A are discharged through the sorters 20 into the guide channels 98, from which the tickets A fall by gravity through the discharge chutes 100 into the collection box 92. After all of the tickets A have been removed from the sorter drum 14, the sorter drum 14 is rotated in the direction of the arrow G to cause the wider tickets B to pass through the sorters 21 into the guide channels 99. The tickets B then fall from the guide channels 99 via the discharge chutes 101 into the collection box 93. Accordingly, the tickets A, B as sorted out are stored in the collection boxes 92, 93, respectively.

Figure 25:
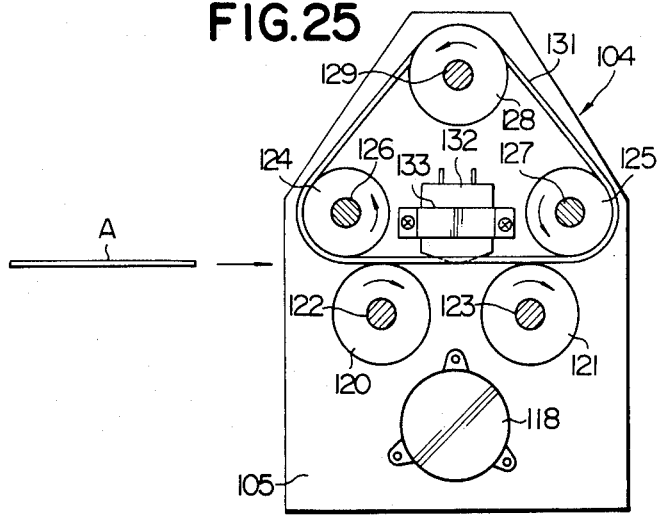
FIG. 25 is a side elevational view, with parts cut away, of the magnetic reader assembly shown in FIG. 24.

FIGS. 23 through 27 illustrate a sorting device according to a still further embodiment of the present invention. This sorting device is of substantially the same construction as that of the sorting device shown in FIG. 4 except for a different magnetic reader assembly 104. The magnetic reader assembly 104 comprises a single magnetic reading head 132 for reading magnetically recorded information on tickets A fed along a path across the single magnetic pickup head 132. The magnetic reader assembly 104 is composed of a casing 103 coupled to the discharge opening of the discharge chute 24 and including a pair of laterally spaced side plates 105, 106 of a relatively increased thickness and a hexagonal shape (FIGS. 25 and 27). As shown in FIG. 25, the magnetic pickup head 132 is fastened by a fastening bracket 133 (FIG. 25) to the side plate 105. The side plate 105 has a lower motor hole 107, a pair of shaft holes 109, 110 positioned upwardly of the motor hole 107, a pair of shaft holes 111, 112 above the shaft holes 109, 110, respectively, and a shaft hole 112 positioned upwardly of the shaft holes 111, 112. Likewise, the side plate 106 has a pair of shaft holes 113, 114, a pair of shaft holes 115, 116 above the shaft holes 113, 114, respectively, and a shaft hole 117 positioned upwardly of the shaft holes 115, 116. The motor hole 107 and the shaft hole 112 in the side plate 105 are located on a vertical central axis of the side plate 105. The shaft holes 108, 109 and the shaft holes 110, 111 are spaced equidistantly on both sides of the vertical central line of the side plate 105 with the shaft holes 108, 109 spaced at a smaller distance than the distance between the shaft holes 110, 111. The shaft holes 113 through 117 defined in the side plate 106 are held in lateral alignment with the shaft holes 108 through 112 in the side plate 105. A motor 118 is fixedly interposed between the side plates 105, 106 and has a motor shaft 119 projecting through the motor hole 107. An idler roller 120 has a shaft 122 having ends rotatably inserted in the shaft holes 108, 113, respectively. Another idler roller 121 has a shaft 123 having ends rotatably inserted in the shaft holes 109, 114, respectively. The idler rollers 120, 121 are interposed between the side plates 105, 106 and have central smaller-diameter portions. A driven roller 124 has a shaft 126 having ends rotatably inserted in the shaft holes 110, 115, respectively. Another driven roller 125 has a shaft 127 having ends rotatably inserted in the shaft holes 111, 116, respectively. A drive roller 128 has a drive shaft 129 having ends rotatably fitted in the shaft holes 112, 117, respectively, one of the ends of the drive shaft 129 projecting beyond the side plate 125. The drive roller 128 has a pair of shallow belt slots 130, 130 defined in outer circumferential surfaces at axial ends thereof. A pair of parallel endless belts 131, 131 are trained around the drive roller 128 and the driven rollers 124, 125 in the shape of a triangle and received in the belt slots 130, 130, respectively. As best shown in FIG. 25, the idler rollers 120, 121 are held against lower horizontal runs of the endless belts 131, 131. A horizontal line tangential to the driven rollers 124, 125 extends parallel to a horizontal line tangential to the idler rollers 120, 121. The magnetic pickup head 132 has a pickup surface facing downwardly and lying substantially flush with the lower runs of the endless belts 131, 131 centrally therebetween. As shown in FIG. 27, a pulley 134 is secured to the projecting end of the motor shaft 119, and a pulley 135 is fixed to the projecting end of the drive shaft 129. An endless belt 126 is trained around the pulleys 134, 135.

Operation of the magnetic reader assembly 104 is as follows: A ticket A as sorted out by the sorter drum 14 is discharged from the discharge chute 24 and delivered into the magnetic reader assembly 104. While the sorting device is in operation, the motor 118 is energized to rotate the drive roller 128 through the pulley 134, the endless belt 136, and the pulley 135. The driven rollers 124, 125 are also rotated by the drive roller 128 through the endless belts 131 travelling in the direction of the arrows (FIG. 27). Since the idler rollers 120, 121 are held against the endless belts 131, the idler rollers 120, 121 are caused to rotate by the endless belts 131. When the ticket A is inserted between the lower runs of the endless belts 131 and the idler roller 120 in the direction of the arrow, the ticket A is gripped between the endless belts 131 and the idler roller 120 and fed along while being resiliently sandwiched therebetween. As the ticket A advances, it then becomes gripped between the endless belts 131 and the idler roller 121. During such horizontal travel of the ticket A as supported by the lower stretches of the endless belts 131 and the idler rollers 120, 121, the magnetic strip 50 is brought into contact with the pickup surface of the magnetic pickup head 132, which then reads various items of information recorded in the magnetic strip 50 and delivers the information to an information processing apparatus (not shown). Then, the ticket A is discharged off the endless belts 131 and the idler roller 121 and falls from the magnetic reader assembly 104 into the collection box 5.

The magnetic reader assemblies 28, 104 are effective in reading information magnetically recorded in the form of a magnetic strip on a variety of pieces of paper or plastic, such as magnetic cards, commuter's tickets, railroad tickets, or price tags. Various items of information relating to pieces with magnetic strips and information on those who carry such cards or tickets can be collected on the basis of data read by the magnetic reader assemblies, so that the sales of goods, tickets sold, and other data can be supervised and analyzed.

Figure 28:
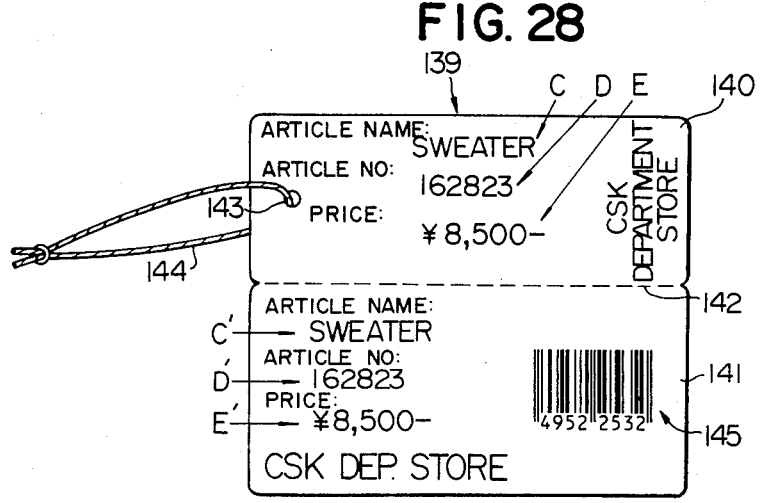
FIG. 28 is an enlarged plan view of a tearable price tag having a bar code.
Figure 29:
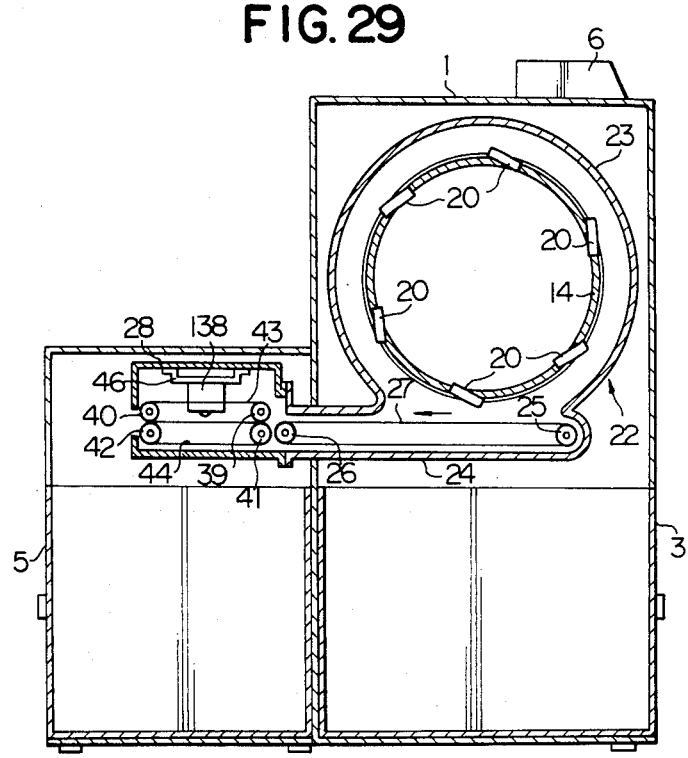
FIG. 29 is a vertical cross-sectional view of a sorting device with an optical reader assembly for reading the bar code on the price tag shown in FIG. 28, according to a still further embodiment of the present invention.

FIG. 29 shows an optical reader 138 mounted on the mount 46 in the reader assembly 28 for reading optically recorded information on a price tag 139, for example, illustrated in FIG. 28. The optical reader 138 may be of any known construction. The price tag 139 is made of cardboard and easily tearable along perforations 142 into a pair of rectangular pieces 104, 141, the piece 141 being collected after torn off. The piece 140 has a hole 143 defined at an end thereof with a tied cord 144 passing therethrough. The price tag 139 is normally attached to an article for sale. When the article is sold, the piece 141 is torn away along the perforations 142 with the piece 140 is left attached to the article. The torn piece 141 is then retained at the counter. The piece 140 has various printed data such as an article name C, an article No. D, and a price E, and the piece 141 also has corresponding printed data C', D' and E'. A bar code 145 indicative of the information C', D' and E' is also printed on the tearable piece 141.

Figure 30:
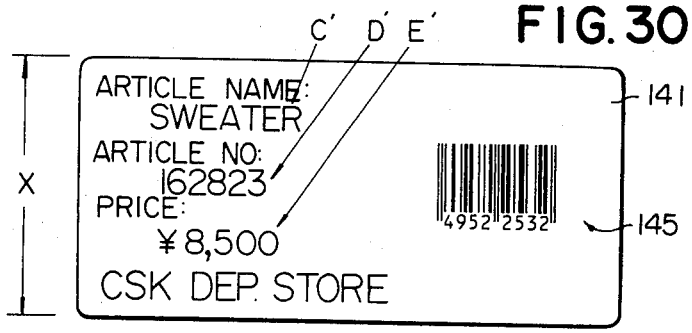
FIGS. 30 and 31 are enlarged plan views of differently sized price tags to be sorted out.
Figure 31:
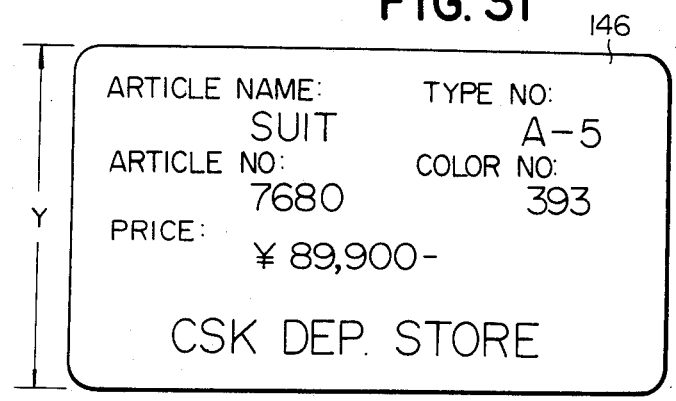
Figure 32:
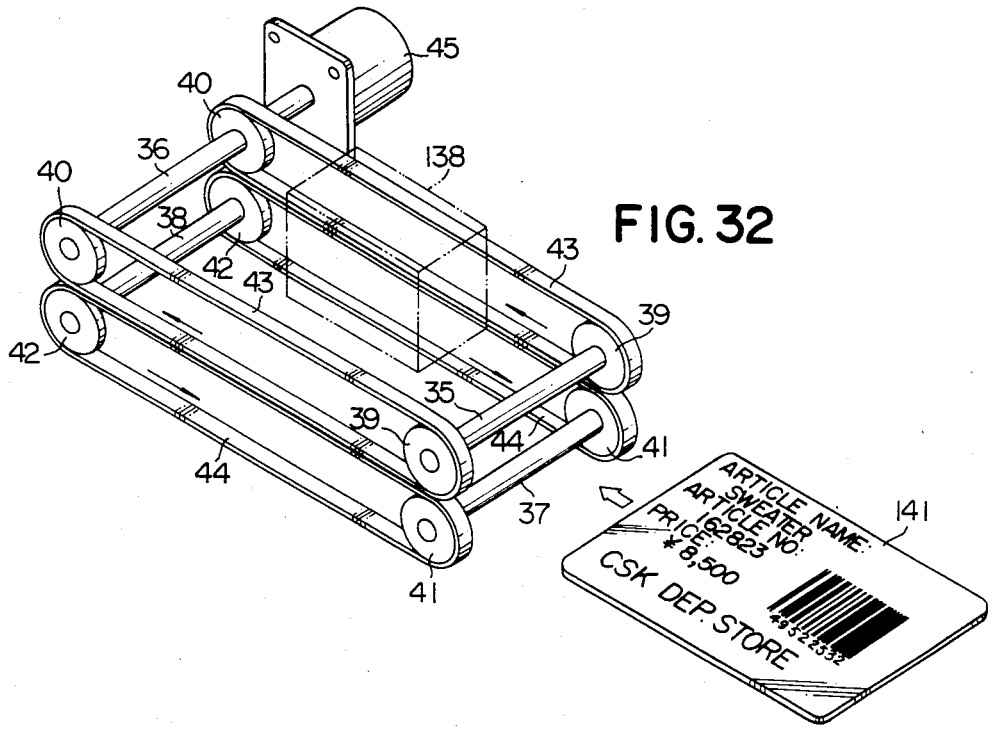
FIG. 32 is an enlarged perspective view of the optical reader assembly shown in FIG. 29.
Figure 33:
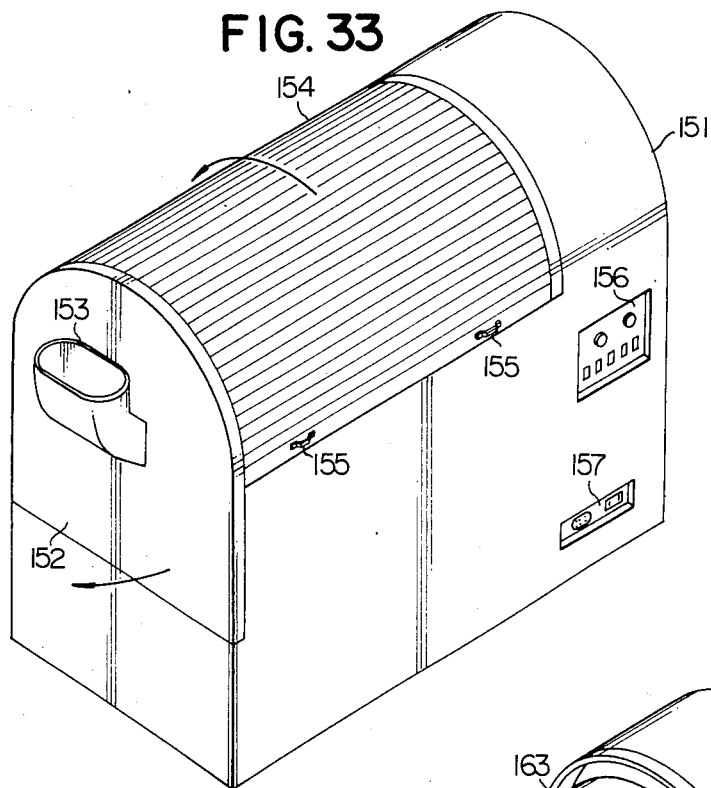
FIG. 33 is a perspective view of a sorting device according to a still further embodiment of the present invention.

As illustrated in FIG. 30, the price tag piece 141 has a width X. Another price tag piece 146 shown in FIG. 31 which has been torn off has no bar code, and is of a width Y larger than the width X. The widths X, Y are selected such that only the piece 141 can pass through the sorters 20 as illustrated in FIG. 29. In operation, a mixture of pieces 141, 146 is put into the drum 14 in the sorting device shown in FIG. 29, and the drum 14 is rotated in one direction to discharge the pieces 141 through the sorters 20. The sorted-out pieces 141 are delivered one by one through the discharge chute 24 toward the optical reader 138. As shown in FIG. 32, the piece 141 is fed along between the endless belts 43, 44. While the piece 141 travels across the optical reader 138, the bar code 145 on the piece 141 moves below the optical reader 138 and is read thereby. The read information is sent from the optical reader to an information processing apparatus or a memory (not shown). When the piece 141 reaches the terminal end of the endless belts 43, 44, that is, the discharge end of the reader assembly 28, the piece 141 falls off into the collection box 5.

FIGS. 33 through 38 illustrate a sorting device according to a still further embodiment of the present invention. The sorting device is particularly suitable for sorting out tickets. The sorting device comprises an elongated body 151 having a semicylindrical upper portion with vertical opposite end faces. To one of the end faces, there is hinged a cover 152 angularly swingable in a lateral direction and having a charging chute 153 projecting centrally from the cover 152 and having an upper open end for receiving tickets to be sorted out. The charging chute 153 is curved with its lower open end opening into a sorter drum (described later) housed in the body 152. The semicylindrical upper portion of the body 151 is partly recessed to provide an opening which is normally closed by a shutter 154 slidably openable along an arcuate path, the shutter 154 having handles 155 on an end thereof. The body 1 has on a side surface a control panel 156 with switches and controllers mounted thereon and a power board 157 with a power inlet and a signal cable connector mounted thereon.

Figure 34:
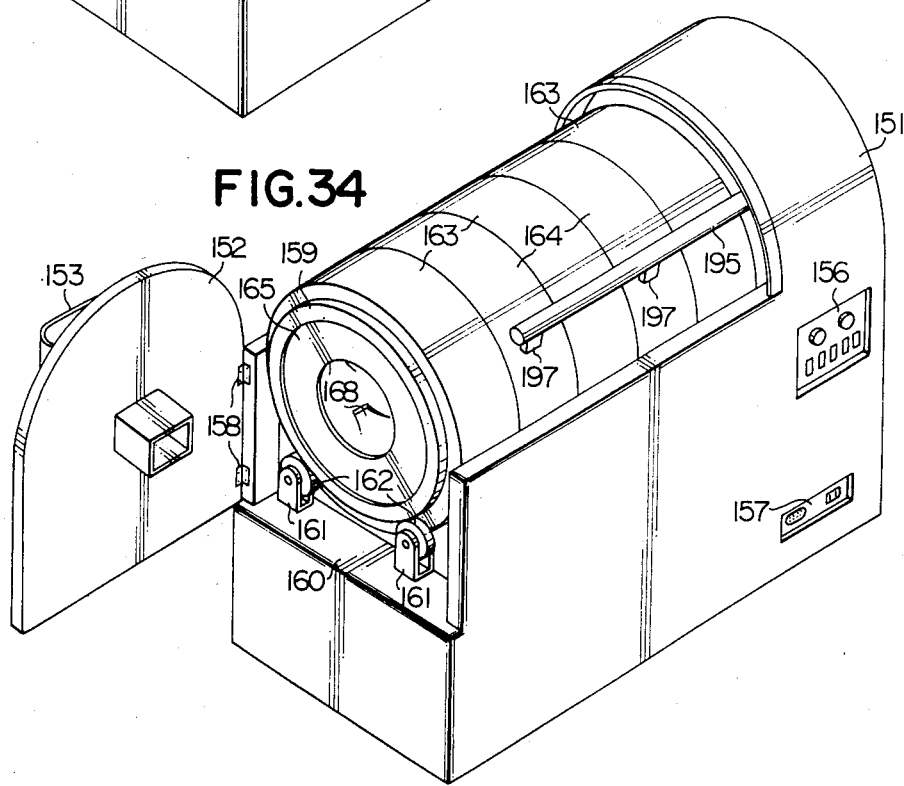
FIG. 34 is a perspective view, with parts removed, of the sorting device illustrated in FIG. 33.

FIG. 34 shows the sorting device with the cover 152 swung open through about 90 degrees and the shutter 154 retracted to uncover the upper open portion of the body 151. The cover 152 is pivotably joined to the body by a pair of hinges 158. The shutter 154 is slidably withdrawn back into a sidewall of the body 151. With the cover 152 and the shutter 154 thus opened, the interior of the body 151 can easily be accessd for maintenance and servicing. A cylindrical sorter drum 159 is horizontally disposed centrally in the body 151 with an axis substantially aligned with the central axis of the semicylindrical upper portion of the body 151. The body 151 includes a pair of transverse supports 160, 160 (FIG. 35) spaced from each other in the longitudinal direction of the body 151. A pair of bearings 161, 161 is mounted on each of the supports 160, 160, and a pair of rollers 162, 162 is rotatably supported on the bearings 161, 161, respectively. The axial ends of the drum 159 are rotatably supported by the rollers 161 on the supports 160. Three first annular guide channels 163 surround the sorter drum 159 in axially spaced relation, and two second annular guide channels 164 axially alternate with the first annular guide channels 163 in surrounding relation to the sorter drum 159.

As shown in FIGS. 35 through 38, the sorter drum 159 is made of a thin metal sheet and has one end closed and other end fitted over an annular plate 165 having a central circular opening. The annular plate 165 serves to prevent tickets from going out of the sorter drum 159 while the tickets are being sorted out. A drive shaft 167 is coaxially connected to the closed end of the sorter drum 159. The sorter drum 159 has thereon a first group of three rows of sorters 168 and a second group of two rows of sorters 169, the rows of sorters 168 axially alternating with the rows of sorters 169. Each sorter 168 is composed of a tapered tongue 198 sheared radially outwardly off the sorter drum 159 to define an opening 202 having a length W. A pair of converging guide strips 200, 200 extends along the side edges of the tapered tongue 198 and cooperates with the tapered tongue 198 in forming a converging guide passage leading to the opening 202. Likewise, each sorter 169 is composed of a tapered tongue 199 sheared radially outwardly off the sorter drum 159 to define an opening 203 having a length V. A pair of converging guide strips 201, 201 extends along the side edges of the tapered tongue 199 and cooperates with the tapered tongue 199 in forming a converging guide passage leading to the opening 203. The tapered tongues 198 are circumferentially oriented in a direction opposite to that in which the tapered tongues 199 are circumferentially oriented. The guide channels 163 are disposed around the rows of first sorters 168 in surrounding relation thereto, while the guide channels 164 are disposed around the rows of second sorters 199 in surrounding relation thereto. Each of the guide channels 163 is composed of a substantially circular plate 171 having a pair of annular flanges or sidewalls with their inner peripheral edges 170 slightly spaced radially outwardly from the outer circumferential surface of the sorter drum 159. The guide channel 163 also includes a discharge chute 174 having a downwardly opening discharge hole. Similarly, each of the guide channels 164 is composed of a substantially circular plate 172 having a pair of annular flanges with their inner peripheral edges 173 slightly spaced radially outwardly from the outer circumferential surface of the sorter drum 159. The guide channel 164 also includes a discharge chute 175 having a downwardly opening discharge hole. The discharge chutes 174, 175 are staggered in the axial direction of the sorter drum 159.

Figure 35:
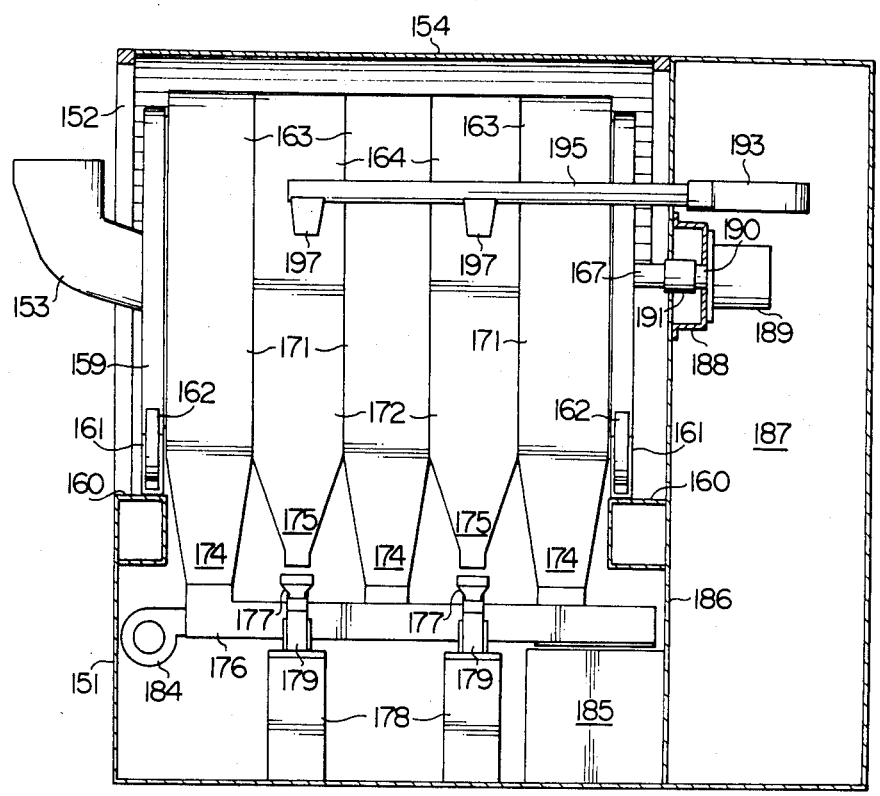
FIG. 35 is a cross-sectional view, partly in side elevation, of the sorting device of FIG. 33.
Figure 36:
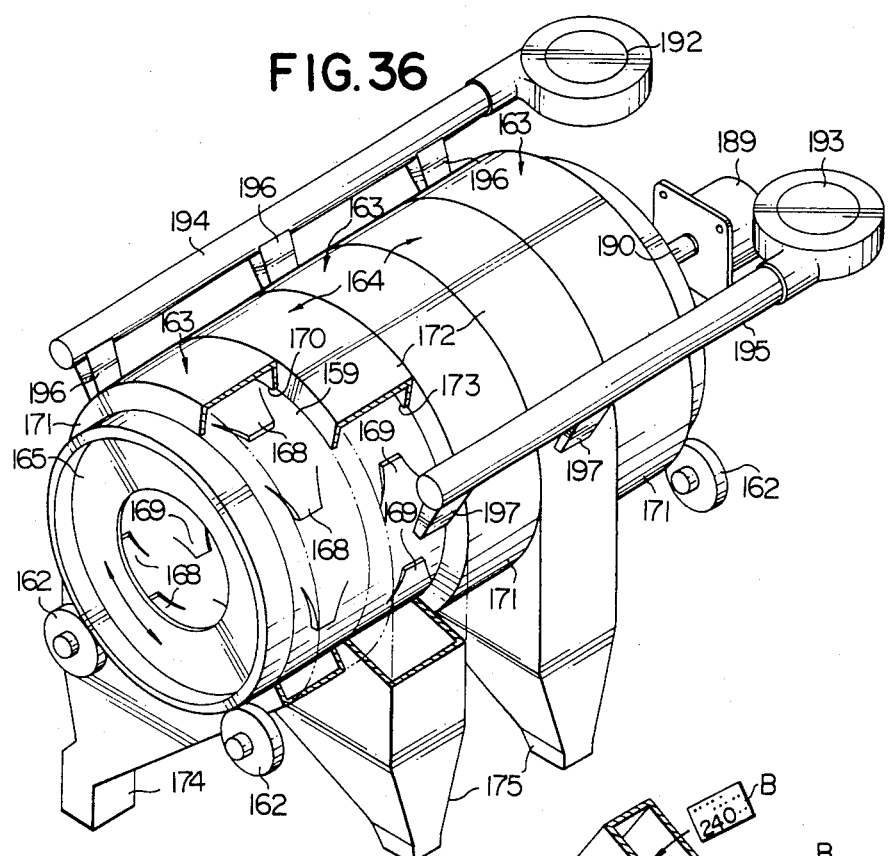
FIG. 36 is a perspective view of a sorter drum with collector guide channels and discharge chutes in the sorting device shown in FIG. 33.
Figure 37:
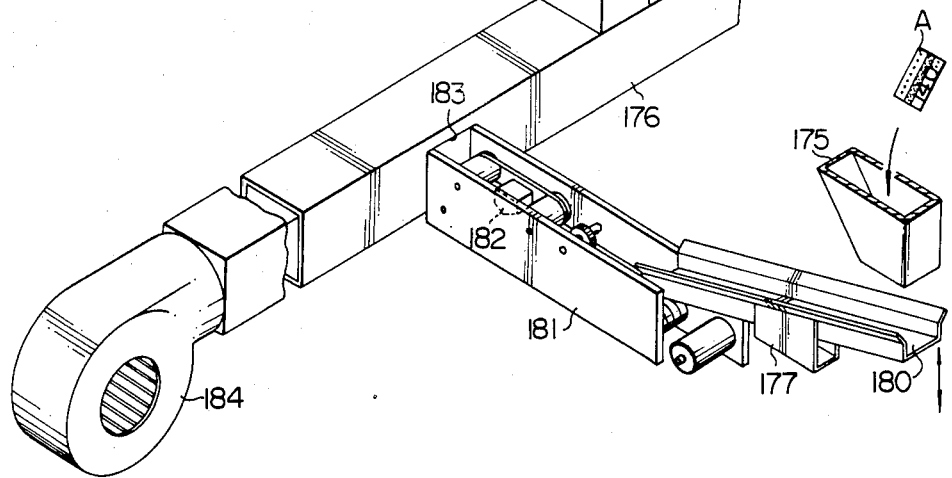
FIG. 37 is an enlarged perspective view of a discharge system in the sorting device of FIG. 33.

As shown in FIG. 37, the open ends of the chutes 174 are connected to a horizontal discharge duct 176. A separator mechanism 177 is disposed below the open end of each of the discharge chutes 175. As shown in FIG. 35, the separator mechanisms 177 are supported respectively on supports 179 mounted on mounts 178, respectively, placed on the bottom of the body 151. In FIG. 37, each separator mechanism 177 includes an electromagnetically vibratable terough 180 inclined downwardly toward the discharge duct 176. A magnetic reader mechanism 181 is disposed between the discharge duct 176 and the trough 180, and comprises a magnetic pickup head 182 and a conveyor belt system for delivering tickets supplied from the trough 180 toward the discharge chute 176 through the magnetic pickup head 182. The magnetic reader mechanism 181 has a terminal end facing an opening 183 defined in a sidewall of the discharge chute 176. The discharge chute 176 is hollow and has a square cross section. An air blower 184 is coupled to an end of the discharge chute 176, the other end of which opens above a shredder 185 (FIG. 35).

The body 151 has a vertical partition 186 on which the support 160 is supported, the vertical partition 186 defining a machine chamber 187 remote from the sorter drum 159. A channel 188 is mounted on the partition 186 in the machine chamber 187 and supports thereon a motor 189 having an output shaft 190 joined by a coupling 191 to the drive shaft 167. As best shown in FIG.

36, a pair of air blowers 192, 193 is disposed in the machine chamber 187 slightly above the motor 189. A pair of horizontal air pipes 194, 195 is coupled to the air blowers 192, 193, respectively, and disposed one on each side of the sorter drum 159. The air pipe 194 communicates through nozzles 196 which the guide channels 163, and the air pipe 195 communicates through nozzles 197 with the guide channels 164. The nozzles 196, 197 are downwardly tapered and have lower open ends directed toward the sorters 168, 169, respectively.

The sorter device of the foregoing construction is particularly useful in a bus transportation system in which two kinds of tickets of different sizes are used. One type of ticket is a ticket of couponds A (FIG. 39) which can be used for buses of a plurality of different bus companies, and the other ticket type is an ordinary ticket B (FIG. 37) that is effective for one of the bus companies only. The ticket A has a width smaller than the length V of the opening 203 of the sorters 169. The ticket B has a width larger than the length V of the opening 203 of the sorters 169, but smaller than the length W of the opening 202 of the sorters 168.

Figure 39:
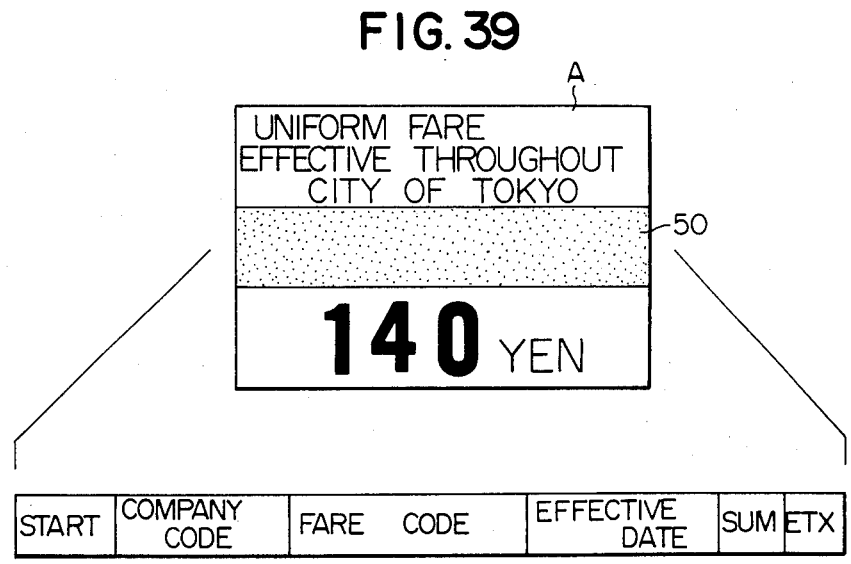
FIG. 39 is a plan view of a ticket with a magnetic strip, showing a magnetically recorded data format.

As shown in FIG. 39, the ticket A has a longitudinal central magnetic strip 50 coated on one surface thereof and having a width that is about one-third of the entire width of the ticket. A fare is printed on the ticket surface other than the magnetic strip 50. Information is magnetically recorded on the magnetic strip 50 in a data format composed of "START", "COMPANY CODE", "FARE CODE", "EFFECTIVE DATA CODE", "SUM", and "ETX". "START" indicates the direction in which the start data reading, "COMPANY CODE" is the predetermined code of the name of a company which issues the ticket A, "FARE CODE" the code of a printed fare, "EFFECTIVE DATE CODE" the code of a final data by which the ticket A is effective, "SUM" the code of a sum check value for all recorded data, and "ETX" indicates the end of data reading.

Figure 40:
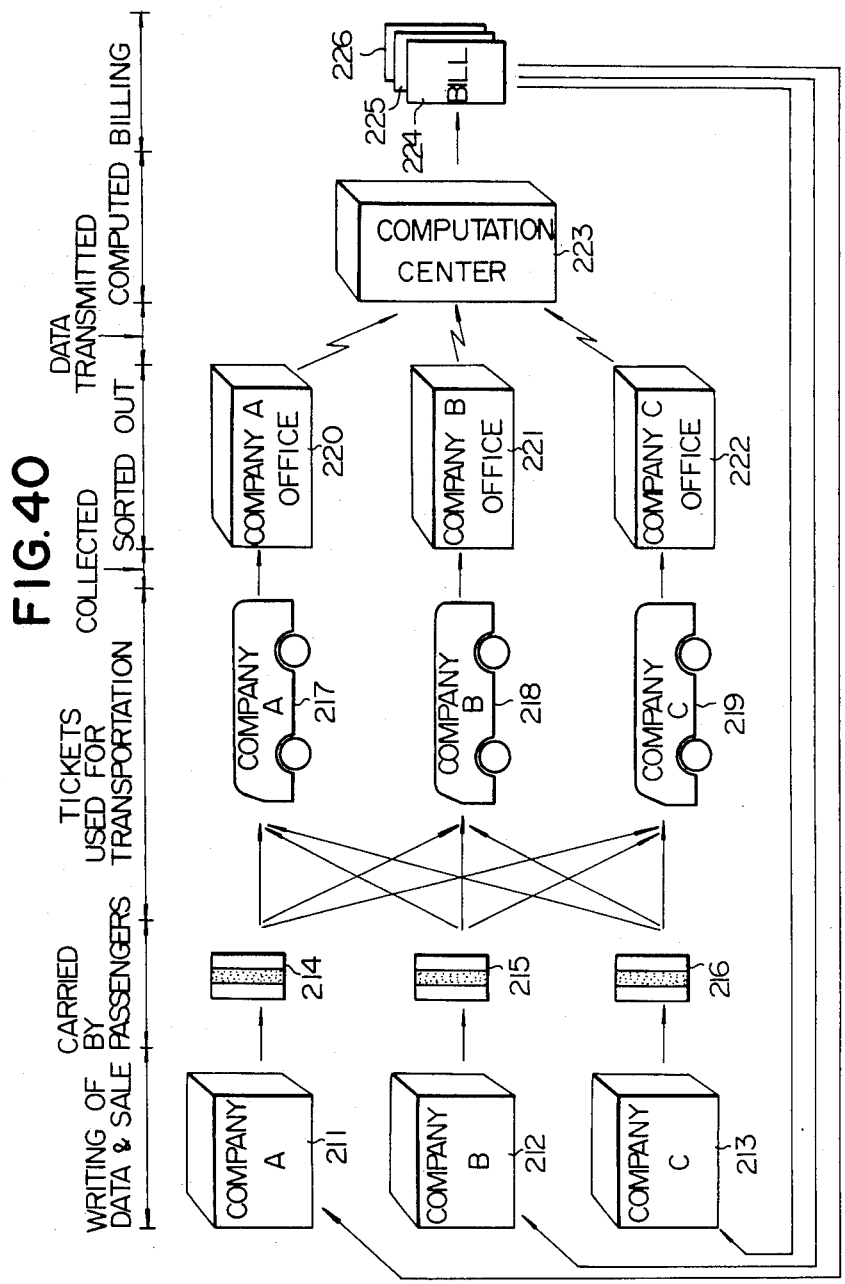
FIG. 40 is a diagram showing a ticket processing system.

FIG. 40 schematically illustrates a billing system for common ticket coupons A which have been used for the buses of three different bus companies A, B, C. The bus companies A, B, C have home offices 211, 212, 213 issuing tickets of coupons 214, 215, 216, respectively each having a magnetic strip 50 on which particular information has magnetically been recorded prior to sales. Passengers with any of coupons 214, 215, 216 can ride on any of buses 217, 218, 219 of the bus companies A, B, C. The bus drivers or conductors admit the passengers after they have confirmed the fares printed on the coupons 214, 215, 216 presented by the passengers. The information on the magnetic strips however is not read or checked on the buses. After the buses have run along their routes, fare boxes are removed from the buses to collect the coupons A, tickets B, coins, bank notes in offices 220, 221, 222 (which may be much more in reality) of the bus companies A, B, C. In the offices 220, 221, 222, the coupons A, tickets B, coins, bank notes are separated, and the magnetic strips on the coupons A are read to total the fares and number of all coupons 214, 215, 216 issued by the bus companies A, B, C. The totalled fare and number are sent from the offices 220, 221, 222 to a computation center 223 on a real-time basis over telephone lines. Alternatively, the information totalled for batches of tickets may be stored in magnetic tapes, which will then be sent to the computation center 223. The computation center 223 stores the totalled data transmitted from the offices 220, 221, 222 and computes the numbers and fares of the tickets 214, 215, 216 used for every week or month. The computed numbers and fares are recorded on bills 224, 225, 226 for the respective bus companies so that the offset fares will be billed for the bus companies. The bills 224, 225, 226 are sent to fthe home offices 211, 212, 213 of the bus companies A, B, C. The bus companies A, B, C then pay the billed amounts to each other. The system in which common ticket coupons A are used for different bus companies is thus run smoothly. The total numbers of tickets 214, 215, 216 collected by the offices 220, 221, 222 tend to disagree with the total numbers of such tickets sold by the offices 211, 212, 212, since some of the tickets are liable to get lost in actual use. The computation center 223 totals the numbers and fares of the tickets A actually collected, and computes the data which indicate how often the tickets 214, 215, 216 are used to ride the buses 217, 218, 219. The result substantially matches the actual use of tickets A.

The ticket sorting device as shown in FIGS. 33 through 37 is located in each of the offices 220, 221, 222 for automatically sorting out tickets A and reading information recorded thereon. Before the tickets A, B are separated by the ticket sorting device, it is necessary to separate coins and bank notes from the tickets A, B through a manual operation or a machine.

Operation of the ticket sorting device will then be described.

Figure 38:
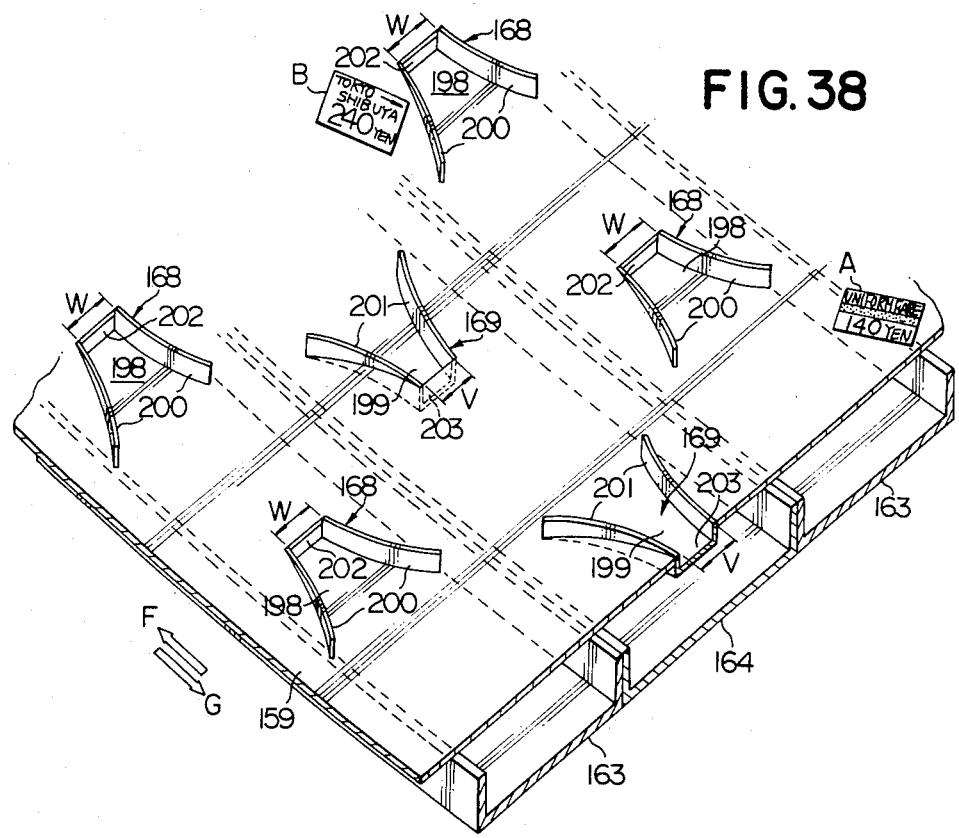
FIG. 38 is an enlarged fragmentary perspective view of the sorter drum shown in FIG. 36.

Mixed tickets A, B are thrown down the chute 153 into the sorter drum 159. The start switch on the control board 156 is turned on to energize the motor 189 to rotate the sorter drum 159 in the direction of the arrow F (FIG. 38). The narrower tickets A are then discharged through the openings 203 of the sorters 169 into the guide channels 164, from which the tickets A are delivered downwardly through the discharge chutes 175. The tickets A from each discharge chute 175 are then placed on the trough 180 which vertically vibrates to feed the tickets A one by one toward the magnetic reader mechanism 181. The tickets A are delivered by the conveyor belt system toward the magnetic pickup head 182, which reads the recorded information from the magnetic strip on the ticket A. The magnetic pickup head 182 issues an electric signal indicative of the read information through the connector on the power board 157 to a data processing and storage system, in which the information is processed and stored for the respective bus companies A, B, C. The tickets A are then discharged from the magnetic reader mechanism 181 into the discharge duct 176, and forced by air currents from the air blower 184 to the other end of the discharge duct 176, from which the tickets A drop into the shredder 185. The tickets A are then cut into pieces by the shredder 185.

After all of the tickets A have been discharged out of the sorter drum 159, the rotation of the motor 189 is reversed to rotate the sorter drum 159 in the direction of the arrow G to allow the tickets B to pass through the openings 202 of the sorters 168 into the guide channels 163. The tickets B then go through the discharge chutes 174 into the discharge duct 184, from which they are blown into the shredder 185.

While the sorter drum 159 rotates to sort out the tickets A, B, the air blowers 192, 193 are actuated to generate air currents through the air pipes 194, 195. The air currents are emitted from the air pipes 194, 195 through the nozzles 196, 197 into the guide channels 163, 164. Since the nozzle ends are directed to the sorters 168, 169, the air currents enter the openings 202, 203 of the sorters 168, 169 to blow any tickets A, B which have been jammed in the openings 202, 203, off into the sorter drum 159. Accordingly, the efficiency of sorting out the tickets is improved.

Figure 41:
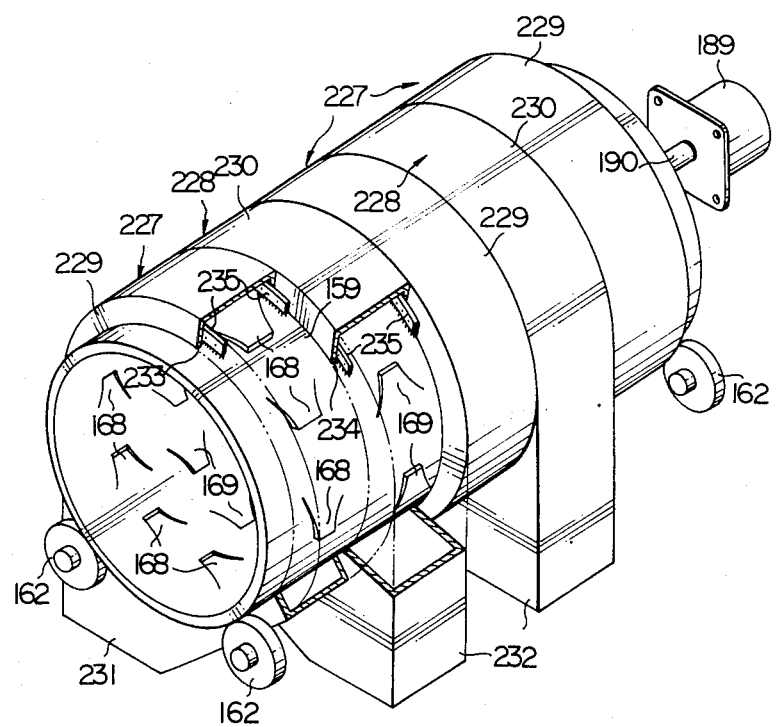
FIG. 41 is a perspective view, partly cut away, of a sorter drum with collector guide channels having seal means according to a still further embodiment of the present invention.
Figure 42:
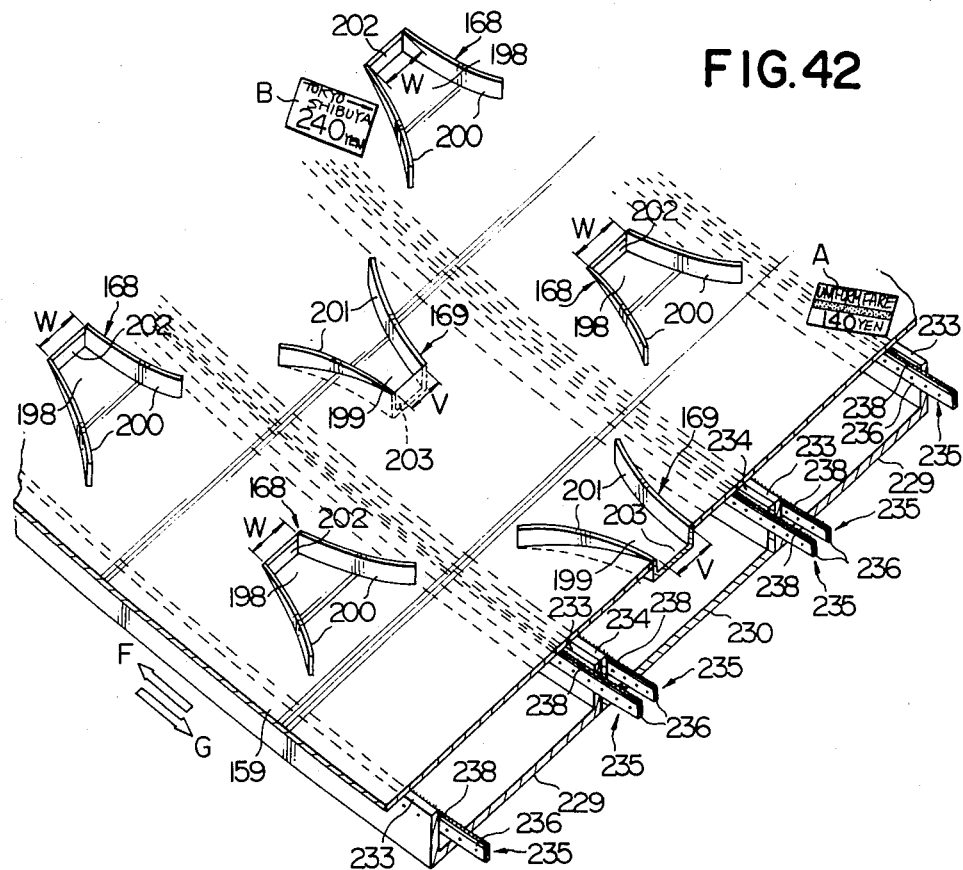
FIG. 42 is an enlarged fragmentary perspective view of the sorter drum illustrated in FIG. 41.
Figure 43:
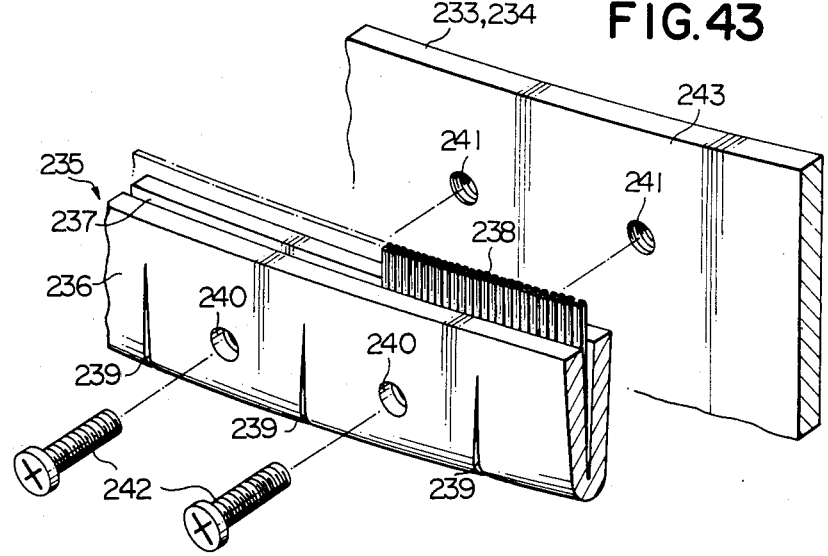
FIG. 43 is an enlarged fragmentary perspective view of the seal means shown in FIG. 41.

FIGS. 41 through 43 illustrate a sorting device according to a still further embodiment of the present invention. The sorting device comprises a sorter drum 159 which is identical in construction to the sorter drum 159 according to the previous embodiment shown in FIGS. 33 through 38. Three guide channels 227 surround the sorter drum 159 and two guide channels 228 surround the sorter drum 159 in axially alternating relation to the three guide channels 227. Each of the guide channels includes an annular plate 229 having a pair of flanges or sidewalls each having an annular edge 233 slightly spaced radially outwardly from the outer circumferential surface of the sorter drum 159. Each guide channel 227 also has a discharge chute 231 directed downwardly and having a downwardly opening end. Likewise, each of the guide channels 228 includes an annular plate 230 having a pair of flanges or sidewalls each having an annular edge 234 slightly spaced radially outwardly from the outer circumferential surface of the sorter drum 159. Each guide channel 228 also has a discharge chute 232 directed downwardly and having a downwardly opening end. The discharge chutes 231, 232 are staggered in the axial direction of the sorter drum 159. As better shown in FIG. 42, an annular seal 235 fastened to and extending along each of the annular sidewalls of the guide channels 227, 228, the annular seal 235 being located within the guide channel 227, 228. As shown in FIG. 43, the annular seal 235 comprises a narrow annular retainer 236 made of aluminum and having a longitudinal slit 237 opening toward the sorter drum 159, and a multiplicity of resilient and electrically conductive bristles 238 gripped in the slit 237, the bristles 238 being made of stainless steel, for example. The bristles 238 have ends retained in the slit 237 and opposite ends held in resilient frictional engagement with the outer circumferential surface of the sorter drum 159. The annular retainer 236 has a plurality of notches 239 defined in its back edge and spaced along its length for allowing the annular retainer 236 to be flexible. The annular retainer 236 with the bristles 238 retained thereby is fastened to a surface 243 of the corresponding sidewall 233, 234 by means fo screws 242 extending through holes 243 defined in the retainer 236 threaded into internally threaded holes 241 in the sidewall 233, 234. Since the bristles 238 frictionally engage the outer circumferential surface of the sorter drum 159, any tickets A, B which have been discharged out of the sorter drum 159 into the guide channels 227, 278 are prevented from slipping out into adjacent guide channels through the space between the sidewall edges 233, 234 of the guide channels 277, 278 and the outer circumferential surface of the sorter drum 159. The electrically conductive bristles 238 can conduct any static electricity which has been generated by the mixing of the tickets A, B to the guide channels 277, 278. Therefore, there is no tendency for the tickets A, B to stick together and attract dust and dirt due to static electricity.

Although certain preferred embodiments have been shown and described, it should be understood that many changes and modifications may be made therein without departing from the scope of the appended claims.

What is claimed is:

1. A device for sorting out a multiplicity of pieces according to their size, comprising:
   a frame;
   a drum rotatably mounted in said frame for storing therein pieces having different sizes to be sorted out;
   first means on said drum including openings of different dimensions for passing therethrough pieces of different sizes, respectively;
   second means disposed peripherally around said drum in radial alignment with those openings of one dimension for collecting pieces of a particular size passing through said last-mentioned openings, said second means including discharge chutes coupled to annular guide channels for discharging the pieces therethrough and a conveyor belt disposed in each of said discharge chutes for transporting the pieces (A) out of the discharge chutes; and
   third meas for rotating said drum about its own axis to cause the pieces of the particular size to be discharged through said openings of said one dimension out of said drum.

2. A device for sorting out a multiplicity of pieces according to their size, comprising:
   a frame;
   a drum rotatably mounted in said frame for storing therein pieces having different sizes to be sorted out;
   first means on said drum including openings of different dimensions for passing therethrough pieces of different sizes, respectively;
   second means disposed peripherally around said drum in radial alignment with those openings of one dimension for collecting pieces of a particular size passing through said last-mentioned openings;
   third means for rotating said drum about its own axis to cause the pieces of the particular size to be discharged through said openings of said one dimension out of said drum;
   fourth means for reading information recorded on surfaces of the pieces collected by said second means and fed therefrom along a path; and
   fifth means for frictionally separating superimposed pieces from each other before they are supplied to said fourth means, said fifth means comprising a pair of rollers, a second pair of rollers spaced from said first pair of rollers and closer to said fourth means than said first pair of rollers, a first rubber tube fitted over one of said first pair of rollers and held against the other of said first pair of rollers for sandwiching the superimposed pieces between said first rubber tube and the other of said first pair of rollers, a second rubber tube fitted over one of said second pair of rollers and held against the other of said second pair of rollers, a slide plate positioned between said first and second pairs of rollers for guiding the superimposed pieces thereover toward said second pair of rollers, a first motor for rotating one of said first pair of rollers about its own axis at a first speed, a second motor for rotating one of said second pair of rollers about its own axis at a second speed greater than said first speed and a pair of endless belts converging toward each other in a direction toward said first pair of rollers for guiding therebetween the superimposed pieces toward said first pair of rollers, whereby one of the superimposed pieces can be separated from the other when engaged between said second pair of rollers.

3. A device for sorting out a multiplicity of pieces according to their size, comprising:

a frame;

a drum having a cylindrical wall rotatably mounted in said frame for storing therein pieces having different sizes to be sorted out;

first means on said drum including openings of different dimensions for passing therethrough pieces of different sizes, respectively, said first means comprising a plurality of axially alternating rows of first and second groups of tapered tongues sheared off said cylindrical wall radially outwardly thereof and extending circumferentially of said cylindrical wall, said first and second groups of tapered tongues terminating respectively in said openings;

second means disposed peripherally around said drum in radial alignment with those openings of one dimension for collecting pieces of a particular size passing through said last-mentioned openings, said second means comprising a plurality of first and second groups of annular guide channels extending circumferentially around said drum in surrounding relation to said first and second groups of tapered tongues for receiving the pieces of different dimensions, respectively, discharged through said openings, said first and second groups of annular guide channels further having spaced sidewalls and held in resilient frictional engagement with an outer circumferential surface of said drum for preventing away piece from passing out said annular guide channels between said outer circumferential surface of said drum and sidewalls; and third means for rotating said drum about its own axis to cause the pieces of the particular size to be discharged through said openings of said one dimension out of said drum.

4. A device according to claim 3, wherein said first and second groups of annular guide channels further comprises spaced sidewalls and an annular seal attached to each of said sidewalls and said annular seal comprises an annular retainer having an elongate slit and fastened to one of said sidewalls on a side surface thereof, and a multiplicity of resilient bristles having ends retained in said slit and opposite ends frictionally engaging the outer circumferential surface of said drum.

* * * * *